(12) United States Patent
Hirata

(10) Patent No.: US 10,969,630 B2
(45) Date of Patent: Apr. 6, 2021

(54) LIQUID CRYSTAL DISPLAY DEVICE

(71) Applicant: SAKAI DISPLAY PRODUCTS CORPORATION, Sakai (JP)

(72) Inventor: Mitsuaki Hirata, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 16/480,400

(22) PCT Filed: Jan. 27, 2017

(86) PCT No.: PCT/JP2017/003024
§ 371 (c)(1),
(2) Date: Oct. 18, 2019

(87) PCT Pub. No.: WO2018/138888
PCT Pub. Date: Aug. 2, 2018

(65) Prior Publication Data
US 2020/0218121 A1  Jul. 9, 2020

(51) Int. Cl.
*G02F 1/1337* (2006.01)
*G02F 1/1343* (2006.01)

(52) U.S. Cl.
CPC .. *G02F 1/133707* (2013.01); *G02F 1/133788* (2013.01); *G02F 1/134336* (2013.01);
(Continued)

(58) Field of Classification Search
CPC ............ G02F 1/1337; G02F 1/133707; G02F 1/133788; G02F 1/134336; G02F 2001/133742; G02F 2201/123
(Continued)

(56) References Cited

U.S. PATENT DOCUMENTS 8,054,429 B2    11/2011  Hanaoka et al.
2003/0043336 A1  3/2003  Sasaki et al.
(Continued)

FOREIGN PATENT DOCUMENTS

JP    2003-149647 A    5/2003
WO   2006/132369 A1   12/2006
(Continued)

*Primary Examiner* — Charles S Chang
(74) *Attorney, Agent, or Firm* — ScienBiziP, P.C.

(57) ABSTRACT

A liquid crystal display apparatus according to an embodiment of the present invention includes a first and a second substrate, and a vertical alignment type liquid crystal layer. The first substrate has a pixel electrode and a first photo alignment film. The second substrate has a counter electrode and a second photo alignment film. Each pixel has a plurality of liquid crystal domains having different reference alignment directions. The plurality of liquid crystal domains include a first liquid crystal domain, the reference alignment direction of the first liquid crystal domain being a first direction. A portion of a plurality of edges of the pixel electrode that is close to the first liquid crystal domain includes a first edge portion, the angle between an azimuth angle direction perpendicular to the first edge portion and pointing toward the inside of the pixel electrode, and the first direction, being greater than 90°. A portion of a region near the first edge portion where the first edge portion intersects with a boundary between the first liquid crystal domain and another liquid crystal domain is referred to as a first bending region. The pixel electrode or the counter electrode has a first slit formed at or near the first bending region and extending substantially parallel to the first direction, and does not have a slit, except for the first slit, in a region near the first edge portion.

12 Claims, 32 Drawing Sheets

(52) U.S. Cl.
CPC ............ *G02F 2001/133742* (2013.01); *G02F 2201/123* (2013.01)

(58) Field of Classification Search
USPC ................................................. 349/129–136
See application file for complete search history.

(56) References Cited

U.S. PATENT DOCUMENTS

| | | |
|---|---|---|
| 2009/0284703 A1 | 11/2009 | Shoraku et al. |
| 2012/0127407 A1* | 5/2012 | Usui ................. G02F 1/133711 349/123 |
| 2012/0133872 A1* | 5/2012 | Kim .................. G02F 1/133753 349/128 |
| 2013/0293815 A1 | 11/2013 | Shibazaki et al. |
| 2013/0329175 A1 | 12/2013 | Kuboki et al. |
| 2014/0253853 A1 | 9/2014 | Yoshida et al. |
| 2016/0054604 A1 | 2/2016 | Hirata |
| 2017/0205670 A1 | 7/2017 | Hirata |

FOREIGN PATENT DOCUMENTS

| | | |
|---|---|---|
| WO | 2012/099047 A1 | 7/2012 |
| WO | 2012/115032 A1 | 8/2012 |
| WO | 2013/054828 A1 | 4/2013 |
| WO | 2016/027316 A1 | 2/2016 |
| WO | 2016/151861 A1 | 9/2016 |
| WO | 2016/166886 A1 | 10/2016 |

* cited by examiner (a) COMPARATIVE EXAMPLE 1
ELECTRODE PATTERN (b) NO INTERCONNECT OR
THE LIKE IS PRESENT IN PIXEL

TRANSMISSION RATIO: 1.00

(c) INTERCONNECT AND
THE LIKE ARE PRESENT IN PIXEL

TRANSMISSION RATIO: 1.00

(a) EXAMPLE 1
ELECTRODE PATTERN (b) NO INTERCONNECT OR
THE LIKE IS PRESENT IN PIXEL

TRANSMISSION RATIO: 1.03

(c) INTERCONNECT AND
THE LIKE ARE PRESENT IN PIXEL

TRANSMISSION RATIO: 1.04

COMPARATIVE EXAMPLE 3

(a)

COMPARATIVE EXAMPLE 4

(b)

(a)

(b)

(c)

(d)

EXAMPLE 2
ELECTRODE PATTERN (a)

NO INTERCONNECT OR
THE LIKE IS PRESENT IN PIXEL (b)

TRANSMISSION RATIO : 1.09

INTERCONNECT AND
THE LIKE ARE PRESENT IN PIXEL (c)

TRANSMISSION RATIO : 1.13

(a)

(b)

(a) EXAMPLE 3 ELECTRODE PATTERN (b) NO INTERCONNECT OR THE LIKE IS PRESENT IN PIXEL

TRANSMISSION RATIO : 1.06

(c) INTERCONNECT AND THE LIKE ARE PRESENT IN PIXEL

TRANSMISSION RATIO : 1.10

(a) EXAMPLE 4 ELECTRODE PATTERN (b) NO INTERCONNECT OR THE LIKE IS PRESENT IN PIXEL

TRANSMISSION RATIO : 1.02

(c) INTERCONNECT AND THE LIKE ARE PRESENT IN PIXEL

TRANSMISSION RATIO : 1.02

EXAMPLE 5
ELECTRODE PATTERN (a)

NO INTERCONNECT OR
THE LIKE IS PRESENT IN PIXEL (b)

TRANSMISSION RATIO : 1.05

INTERCONNECT AND
THE LIKE ARE PRESENT IN PIXEL (c)

TRANSMISSION RATIO : 1.06

(a) EXAMPLE 6 ELECTRODE PATTERN (b) NO INTERCONNECT OR THE LIKE IS PRESENT IN PIXEL

TRANSMISSION RATIO : 1.02

(c) INTERCONNECT AND THE LIKE ARE PRESENT IN PIXEL

TRANSMISSION RATIO : 1.03

ACTIVE MATRIX SUBSTRATE SIDE (a)

COUNTER SUBSTRATE SIDE (b)

LIQUID CRYSTAL LAYER (c)

LIQUID CRYSTAL DISPLAY DEVICE

TECHNICAL FIELD

The present invention relates to liquid crystal display apparatuses, and more particularly, to a liquid crystal display apparatus which includes a vertical alignment type liquid crystal layer and in which pretilt directions of liquid crystal molecules are defined by alignment films.

BACKGROUND ART

Display performances of liquid crystal display apparatuses have been improved, and therefore, liquid crystal display apparatuses have been used in more and more applications such as television sets. The viewing angle characteristics of liquid crystal display apparatuses have been improved, but further improvements are desired. In particular, there is a strong demand for improvement of the viewing angle characteristics of a liquid crystal display apparatus employing a vertical alignment type liquid crystal layer (also called a "vertical alignment (VA) mode liquid crystal display apparatus").

At present, in VA mode liquid crystal display apparatuses used in large-size display apparatuses such as televisions, the alignment division structure, in which a plurality of liquid crystal domains are formed in a pixel, is employed in order to improve the viewing angle characteristics. As a representative technique for forming the alignment division structure, the multi-domain vertical alignment (MVA) mode is known.

In the MVA mode, an alignment control structure is provided on the side facing the vertical alignment type liquid crystal layer of each of a pair of substrates facing each other with the vertical alignment type liquid crystal layer interposed therebetween, so that a plurality of liquid crystal domains (typically, four alignment directions) having different alignment directions (tilt directions) are formed in each pixel. As the alignment control structure, slits (openings) or ribs (protrusion structures) that are provided on electrodes are used, and exert alignment control force from both sides of the liquid crystal layer.

However, if slits or ribs are used, the linear shape of the slits or ribs leads to non-uniform alignment control force applied to liquid crystal molecules in the pixel, unlike the conventional twisted nematic (TN) mode, etc., in which pretilt directions are defined by alignment films. Therefore, a distribution of response speed occurs in the pixel.

In order to circumvent this problem, even in VA mode liquid crystal display apparatus, the alignment division structure is preferably formed by defining pretilt directions using alignment films. Patent Document No. 1 discloses a liquid crystal display apparatus in which the alignment division structure is formed in such a manner.

In the liquid crystal display apparatus disclosed in Patent Document No. 1, a four-domain structure is formed by defining pretilt directions using alignment films. Specifically, when a voltage is applied to the liquid crystal layer, four liquid crystal domains are formed in a pixel. Such a four-domain structure is also simply called a 4D structure.

In addition, in the liquid crystal display apparatus disclosed in Patent Document No. 1, a pretilt direction defined by one of the pair of alignment films facing each other with the liquid crystal layer interposed therebetween, is about 90° different from a pretilt direction defined by the other alignment film. Therefore, when a voltage is applied, liquid crystal molecules take twisted orientations. Thus, a VA mode in which twisted orientations of liquid crystal molecules are produced by a pair of vertical alignment films arranged so as to define orthogonal pretilt directions (alignment treatment directions) is also denoted as a vertical alignment twisted nematic (or denoted as a vertically aligned twisted nematic) (VATN) mode or a reverse twisted nematic (RTN) mode. As described above, in the liquid crystal display apparatus of Patent Document No. 1, the 4D structure is formed, and therefore, the display mode of the liquid crystal display apparatus of Patent Document No. 1 is also called a 4D-RTN mode.

However, in the VATN mode liquid crystal display apparatus, as described in Patent Document No. 1, a dark line (a region darker than other regions) occurs near an edge of a pixel electrode, extending parallel to the edge. The dark line causes a decrease in transmittance (a decrease in efficiency of use of light).

Patent Document Nos. 2, 3, and 4 each disclose a technique of forming a plurality of slits in a predetermined region of a pixel electrode in order to reduce a decrease in transmittance caused by the dark line.

CITATION LIST

Patent Literature

Patent Document No. 1: International Publication WO2006/132369
Patent Document No. 2: International Publication WO2012/099047
Patent Document No. 3: International Publication WO2016/166886
Patent Document No. 4: International Publication WO2016/151861

SUMMARY OF INVENTION

Technical Problem

However, the present inventor has extensively studied to find that in the case where slits are formed as disclosed in Patent Document Nos. 2, 3, and 4, display quality unfortunately decreases. Specifically, it was found that when a panel is pressed with a finger, a trace of that may be observed, and that when a displayed image is changed, image persistence (ghost image) may occur. As described in more detail below, a cause for these problems may be that the average alignment direction of the liquid crystal domain is different from the direction in which the slits extend (slit direction), or that the direction of the alignment control force by the alignment film on the pixel electrode is different from the slit direction, and therefore, when the alignment is disturbed (due to pressing with a finger or changing of images), the alignment is fixed to a quasi-stable state.

With the above problems in mind, the present invention has been made. It is an object of the present invention to improve, without a decrease in display quality, the transmittance of a VA mode liquid crystal display apparatus in which an alignment division structure is formed by defining pretilt directions using alignment films.

Solution to Problem

A liquid crystal display apparatus according to an embodiment of the present invention is a liquid crystal display apparatus including a first and a second substrate facing each other, a liquid crystal layer of a vertical alignment type provided between the first and second substrates, and a plurality of pixels arranged in a matrix. The first substrate has a pixel electrode provided for each of the plurality of pixels, and a first photo alignment film provided between the pixel electrode and the liquid crystal layer. The second substrate has a counter electrode facing the pixel electrode, and a second photo alignment film provided between the counter electrode and the liquid crystal layer. Each of the plurality of pixels has a plurality of liquid crystal domains having different reference alignment directions defined by the first and second photo alignment films. The plurality of liquid crystal domains include a first liquid crystal domain, the reference alignment direction of the first liquid crystal domain being a first direction. A portion of a plurality of edges of the pixel electrode that is close to the first liquid crystal domain includes a first edge portion, the angle between an azimuth angle direction perpendicular to the first edge portion and pointing toward the inside of the pixel electrode, and the first direction, being greater than 90°. A portion of a region near the first edge portion of each of the plurality of pixels where the first edge portion intersects with a first boundary between the first liquid crystal domain and another liquid crystal domain is referred to as a first bending region. The pixel electrode or the counter electrode has a first slit formed at or near the first bending region and extending substantially parallel to the first direction, and does not have a slit, except for the first slit, in a region near the first edge portion.

Advantageous Effects of Invention

According to the embodiment of the present invention, the transmittance of a VA mode liquid crystal display apparatus in which an alignment division structure is formed by defining pretilt directions using alignment films, can be improved without a decrease in display quality.

BRIEF DESCRIPTION OF DRAWINGS

FIG. 7(a) is a diagram showing an electrode pattern that was used, and FIGS. 7(b) and 7(c) are diagrams showing the results of obtaining a transmittance distribution in a pixel during white display by the simulation.

FIG. 8(a) is a diagram showing an electrode pattern that was used, and FIGS. 8(b) and 8(c) are diagrams showing the results of obtaining a transmittance distribution in a pixel during white display by the simulation.

FIG. 18(a) is a cross-sectional view taken along line 18A-18A' of FIG. 18(b).

FIG. 20(a) is a diagram showing an electrode pattern that was used, and FIGS. 20(b) and 20(c) are diagrams showing the results of obtaining a transmittance distribution in a pixel during white display by the simulation.

FIG. 23(a) is a diagram showing an electrode pattern that was used, and FIGS. 23(b) and 23(c) are diagrams showing the results of obtaining a transmittance distribution in a pixel during white display by the simulation.

FIG. 28(a) is a diagram showing an electrode pattern that was used, and FIGS. 28(b) and 28(c) are diagrams showing the results of obtaining a transmittance distribution in a pixel during white display by the simulation.

FIG. 30(a) is a diagram showing an electrode pattern that was used, and FIGS. 30(b) and 30(c) are diagrams showing the results of obtaining a transmittance distribution in a pixel during white display by the simulation.

FIG. 32(a) is a diagram showing an electrode pattern that was used, and FIGS. 32(b) and 32(c) are diagrams showing the results of obtaining a transmittance distribution in a pixel during white display by the simulation.

DESCRIPTION OF EMBODIMENTS

Firstly, main terms used herein will be described.

As used herein, the term "vertical alignment type liquid crystal layer" refers to a liquid crystal layer in which liquid crystal molecules are oriented substantially perpendicularly (e.g., at an angle of about 85° or more) to the surface of an alignment film (vertical alignment film). Liquid crystal molecules contained in the vertical alignment type liquid crystal layer have negative dielectric anisotropy. Normally black mode display is carried out by combining the vertical alignment type liquid crystal layer with a pair of polarizing plates that are arranged in crossed Nicols (i.e., the transmission axes of the polarizing plates are substantially orthogonal), facing each other with the liquid crystal layer interposed therebetween.

As used herein, the term "pixel" refers to the smallest unit that represents a particular gray level in display, and in the case of color display, corresponds to a unit that represents the gray level of each of R, G, and B, for example. A combination of an R pixel, a G pixel, and a B pixel forms a color display pixel. As used herein, a region (pixel region) of a liquid crystal display apparatus corresponding to a "pixel" in display is also referred to as a "pixel."

The term "pretilt direction" refers to an alignment direction of liquid crystal molecules defined by alignment films, which is an azimuth angle direction in a display plane. The angle at which liquid crystal molecules in this case are oriented relative to the surface of the alignment film is referred to as a "pretilt angle." An alignment treatment applied to the alignment film (a treatment for imparting, to the alignment film, the ability to define a predetermined pretilt direction) is preferably performed by a photo alignment treatment as described below.

By changing the combination of pretilt directions defined by a pair of alignment films facing each other with a liquid crystal layer interposed therebetween, the four-domain structure can be formed. When a pixel (pixel region) is divided into four, the pixel has four liquid crystal domains.

Figure 37:
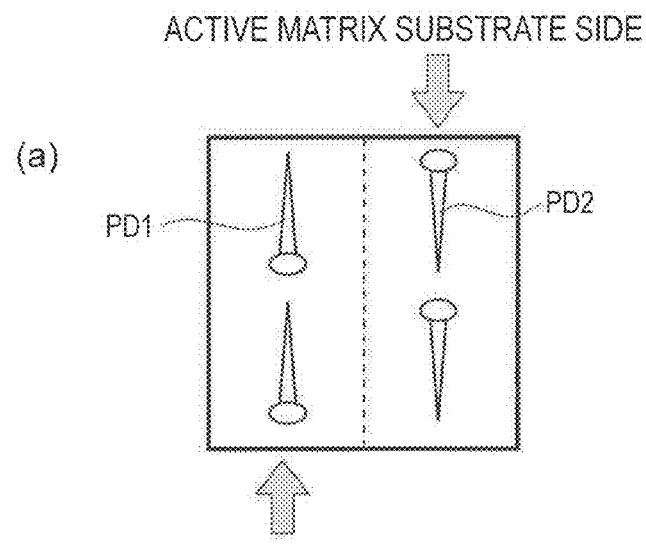
FIGS. 37(a), 37(b), and 37(c) are diagrams for describing a method for obtaining the alignment division structure of the pixel 900P of FIG. 36.
Figure 37:
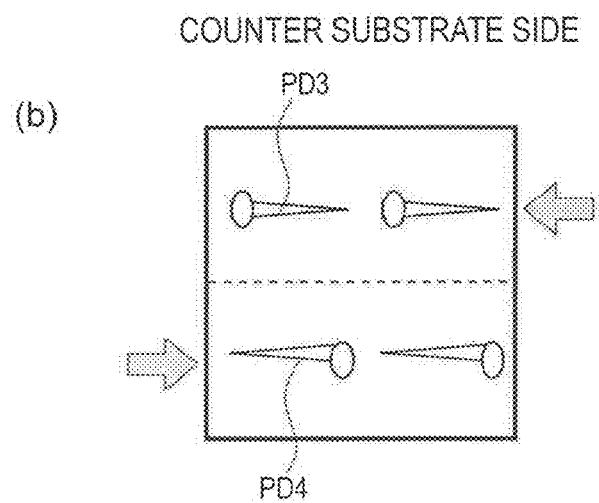
Figure 37:
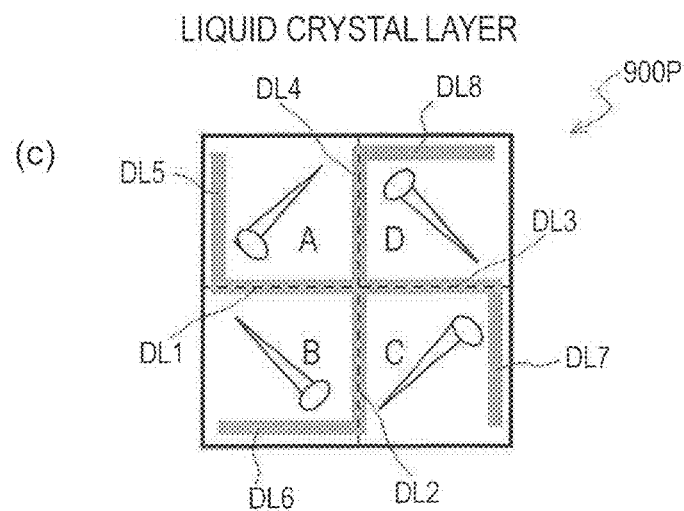

Each liquid crystal domain is characterized by a tilt direction (also referred to as a "reference alignment direction") of liquid crystal molecules at or near the center in the layer plane and in the thickness direction of the liquid crystal layer when a voltage is applied to the liquid crystal layer. The tilt direction (reference alignment direction) has a dominant influence on the viewing angle dependency of each domain. Given a vector of a tilted liquid crystal molecule pointing from an end thereof closer to the back substrate toward the farther end (i.e., an end thereof closer to the front substrate) (a vector from the tip toward the head of a pin shown in FIG. 37 described below), the tilt direction is the direction of a component in the substrate surface (a projection on the substrate surface) of the vector, which is an azimuth angle direction. The azimuth angle direction is measured with reference to the horizontal direction in the display plane, and counterclockwise rotations represent positive rotations (when the display plane is compared to a clock face, the three o'clock direction is denoted as an azimuth angle of 0°, and counterclockwise rotations represent positive rotations). If the tilt directions of the four liquid crystal domains are set so that the angle between any two of the tilt directions is substantially equal to an integer multiple of 90° (e.g., the 10:30 direction, 7:30 direction, 4:30 direction, and 1:30 direction), the viewing angle characteristics are averaged, and therefore, good display can be obtained. In addition, the four liquid crystal domains have substantially equal areas in the pixel region in terms of uniformity of viewing angle characteristics.

A vertical alignment type liquid crystal layer illustrated in embodiments described below contains liquid crystal molecules having negative dielectric anisotropy (a nematic liquid crystal material having negative dielectric anisotropy). In the vertical alignment type liquid crystal layer, a pretilt direction defined by one of the alignment films is about 90° different from a pretilt direction defined by the other alignment film. A tilt direction (reference alignment direction) is defined as an intermediate direction between the two pretilt directions. When a voltage is applied to the liquid crystal layer, liquid crystal molecules near the alignment films take twisted orientations according to the alignment control forces of the alignment films. A chiral dopant may not be added to the liquid crystal layer, or a chiral dopant may be added to the liquid crystal layer if necessary. The VA mode in which twisted orientations of liquid crystal molecules are produced by thus employing a pair of vertical alignment films provided to define orthogonal pretilt directions (alignment treatment directions) is also called a vertical alignment twisted nematic (VATN) mode. In the VATN mode, preferably, the pair of alignment films defines substantially equal pretilt angles.

An alignment treatment to the alignment films is preferably a photo alignment treatment in terms of mass productivity. The photo alignment treatment can be carried out in a contactless manner, and therefore, static electricity does not occur due to rubbing of a rubbing treatment, leading to prevention of yield decrease. In addition, by employing a photo alignment film containing a photosensitive group, variations in pretilt angles can be reduced.

Next, an alignment division structure in the 4D-RTN mode will be described.

Figure 36:
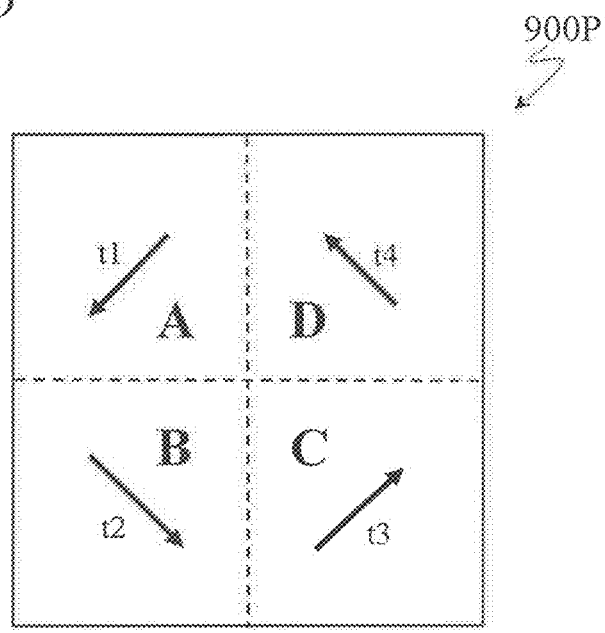
FIG. 36 is a diagram showing an alignment division structure of a pixel 900P in a typical 4D-RTN mode liquid crystal display apparatus.

FIG. 36 shows an alignment division structure of a pixel 900P in a typical 4D-RTN mode liquid crystal display apparatus. As shown in FIG. 36, when a voltage is being applied to the liquid crystal layer, four liquid crystal domains A, B, C, and D are formed in the pixel 900P. The four liquid crystal domain A, B, C, and D are arranged in a 2×2 matrix.

The azimuths of directors t1, t2, t3, and t4 of the liquid crystal domains A, B, C, and D are such that the angle between any two of these azimuths is substantially equal to an integer multiple of 90°. The directors t1, t2, t3, and t4 are representative alignment directions of liquid crystal molecules contained in the respective liquid crystal domains. In the 4D-RTN mode, the director refers to the tilt direction of liquid crystal molecules at or near the center in the layer plane and in the thickness direction of the liquid crystal layer (i.e., located at or near the center when the liquid crystal domain is viewed in the direction normal to the display plane and when the liquid crystal domain is viewed in a cross-section taken along the direction normal to the display plane) when a voltage is applied to the liquid crystal layer. Each liquid crystal domain is characterized by the azimuth of the director (the above tilt direction). The director azimuth has a dominant influence on the viewing angle dependency of each domain.

Here, a pair of polarizing plates is arranged, facing each other with the liquid crystal layer interposed therebetween, and with their transmission axes (polarization axes) orthogonal to each other. More specifically, the pair of polarizing plates is arranged so that one of their transmission axes is parallel to the horizontal direction of the display plane (the 3 o'clock direction, the 9 o'clock direction), and the other transmission axis is parallel to the vertical direction of the display plane (the 12 o'clock direction, the 6 o'clock direction).

Assuming that the azimuth angle (3 o'clock direction) of the horizontal direction of the display plane is 0°, the azimuth of the director t1 of the liquid crystal domain A is an about 225° direction, the azimuth of the director t2 of the liquid crystal domain B is an about 315° direction, the azimuth of the director t3 of the liquid crystal domain C is an about 45° direction, and the azimuth of the director t4 of the liquid crystal domain D is an about 135° direction. In other words, the liquid crystal domains A, B, C, and D are arranged so that the azimuths of the directors of adjacent liquid crystal domains are about 90° different from each other.

Here, a division method for obtaining the alignment division structure of the pixel 900P shown in FIG. 36 will be described with reference to FIGS. 37(a), 37(b), and 37(c). FIG. 37(a) shows pretilt directions PD1 and PD2 defined by an alignment film provided on an active matrix substrate. FIG. 37(b) shows pretilt directions PD3 and PD4 defined by an alignment film provided on a counter substrate. FIG. 37(c) shows tilt directions (directors) when a voltage is applied to the liquid crystal layer after the active matrix substrate and the counter substrate are attached together. Note that FIGS. 37(a), 37(b), and 37(c) show the active matrix substrate, the counter substrate, and the liquid crystal layer as viewed from a viewer. Therefore, in FIG. 37(a), the alignment film is located closer to the viewer of the drawing sheet than is the substrate, and in FIG. 37(b), the alignment film is located deeper from the viewer of the drawing sheet than is the substrate. The pretilt directions and the tilt directions are represented by schematic pins. The head (end portion having a larger area) of a pin represents a front end portion (closer to the viewer) of a liquid crystal molecule, and the tip (end portion having a smaller area) of a pin represents an end portion closer to a back end portion of the liquid crystal molecule.

As shown in FIG. 37(a), a region (a region corresponding to one pixel 900P) of the active matrix substrate is vertically divided into two. The respective alignment films (vertical alignment films) of the regions (the left region and the right region) have been subjected to an alignment treatment so as to be able to define the antiparallel pretilt directions PD1 and PD2. Here, a photo alignment treatment is carried out by oblique irradiation with ultraviolet light (e.g., linear polarized ultraviolet light) in directions indicated by arrows.

Meanwhile, as shown in FIG. 37(b), a region (a region corresponding to one pixel 900P) of the counter substrate is horizontally divided into two. The respective alignment films (vertical alignment films) of the regions (the upper region and the lower region) have been subjected to an alignment treatment so as to be able to define the antiparallel pretilt directions PD3 and PD4. Here, a photo alignment treatment is carried out by oblique irradiation with ultraviolet light (e.g., linear polarized ultraviolet light) in directions indicated by arrows.

By attaching together the active matrix substrate and the counter substrate that have been subjected to the alignment treatments as shown in FIGS. 37(a) and 37(b), the alignment division pixel 900P can be formed as shown in FIG. 37(c). As can be seen from FIGS. 37(a), 37(b), and 37(c), in each of the liquid crystal domains A-D, a pretilt direction defined by the photo alignment film on the active matrix substrate is about 90° different from a pretilt direction defined by the photo alignment film on the counter substrate, and a tilt direction (the azimuth of a director in each liquid crystal domain) is defined that is an intermediate direction between the two pretilt directions.

Figure 38:
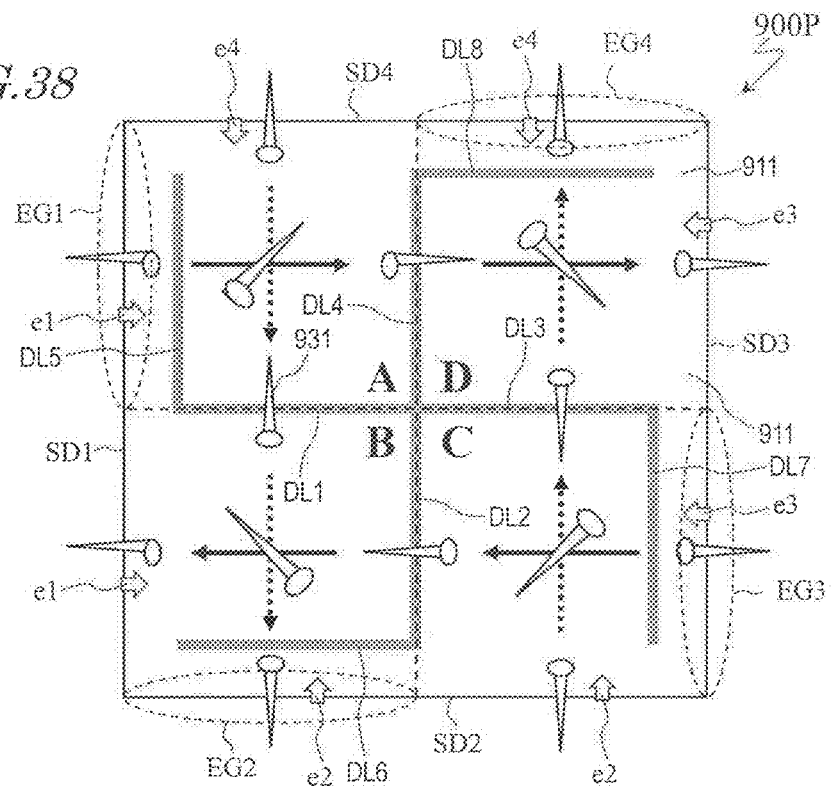
FIG. 38 is a plan view schematically showing an aligned state of liquid crystal molecules 931 in the pixel 900P.

In addition, as shown in FIG. 37(c), in the pixel 900P having the alignment division structure, dark lines DL1-DL8 occur. The dark lines DL1-DL8 include dark lines DL1-DL4 that each occur at a boundary between adjacent liquid crystal domains, and dark lines DL5-DL8 that occur near edges of the pixel electrode. In the example of FIG. 37(c), the dark lines DL1-DL8 together form a right-facing swastika shape. The reason why such dark lines DL1-DL8 occur will now be described with reference to FIG. 38. FIG. 38 shows a cross-sectional view and a plan view schematically showing an aligned state of liquid crystal molecules 931 in the pixel 900P.

Firstly, the reason why the dark lines DL1-DL4 occur will be described.

When a voltage is applied between a pixel electrode 911 and a counter electrode, a vertical electric field is generated in the liquid crystal layer, so that liquid crystal molecules 931 in the liquid crystal layer are oriented in a direction perpendicular to the electric field. In other words, the liquid crystal molecules 931 fall down and are oriented parallel to the substrate surface. At this time, the azimuth of the director of the liquid crystal molecules 931 in each liquid crystal domain is controlled by the pretilt direction defined by the alignment film on the active matrix substrate (indicated by a dotted-line arrow in FIG. 38) and the pretilt direction defined by the alignment film on the counter substrate (indicated by a solid-line arrow in FIG. 38). Specifically, the azimuths of the directors in the liquid crystal domains A, B, C, and D are an about 225° direction, an about 315° direction, an about 45° direction, and an about 135° direction, respectively.

At and near the boundary between adjacent liquid crystal domains, the alignment direction of the liquid crystal molecules 931 continuously changes (because of the properties of liquid crystal as a continuous elastic body). Therefore, for example, at the boundary between the liquid crystal domains A and B, the liquid crystal molecules 931 are oriented in an about 270° direction. Likewise, the liquid crystal molecules 931 are oriented in an about 0° direction, an about 90° direction, and an about 180° direction at the boundary between the liquid crystal domains B and C, at the boundary between the liquid crystal domains C and D, and at the boundary between the liquid crystal domains D and A. The 0° direction, 90° direction, 180° direction, and 270° direction are parallel or perpendicular to the transmission axis of each of the pair of polarizing plates, and therefore, the dark lines DL1-DL4 occur at the boundaries between adjacent liquid crystal domains.

Next, the reason why the dark lines DL5-DL8 occur will be described.

If an edge of the pixel electrode 911 that is located near a liquid crystal domain has a portion where the angle between the azimuth angle direction that is perpendicular to that edge and points toward the inside of the pixel electrode 911 and the tilt direction (reference alignment direction) of that liquid crystal domain is greater than 90° (that portion is hereinafter referred to as an "edge portion"), a dark line is formed further inside than the edge portion, extending parallel to the edge portion.

As shown in FIG. 38, the pixel electrode 911 has four edges (sides) SD1, SD2, SD3, and SD4. Oblique electric fields that are generated at the edges SD1, SD2, SD3, and SD4 when a voltage is applied, exert alignment control forces that are perpendicular to the respective edges, and have respective components in directions (azimuth angle directions) toward the inside the pixel electrode 911. In FIG. 38, the azimuth angle directions that are perpendicular to the four edges SD1, SD2, SD3, and SD4, and point toward the inside of the pixel electrode 911, are indicated by arrows e1, e2, e3, and e4.

Each of the four liquid crystal domains A, B, C, and D is located close to two of the four edges SD1, SD2, SD3, and SD4 of the pixel electrode 911, and when a voltage is applied, receives alignment control forces caused by oblique electric fields generated by the edges.

At an edge portion EG1 (the upper half of the left edge SD1) of the edges of the pixel electrode 911 that are located close to the liquid crystal domain A, the angle between the azimuth angle direction e1 that is perpendicular to the edge portion EG1 and points toward the inside of the pixel electrode 911, and the tilt direction t1 of the liquid crystal domain A, is greater than 90° (specifically, generally 135°).

As a result, in the liquid crystal domain A, when a voltage is applied, the dark line DL5 occurs, extending parallel to the edge portion EG1.

Likewise, at an edge portion EG2 (the left half of the lower edge SD2) of the edges of the pixel electrode 911 that are located close to the liquid crystal domain B, the angle between the azimuth angle direction e2 that is perpendicular to the edge portion EG2 and points toward the inside of the pixel electrode 911, and the tilt direction t2 of the liquid crystal domain B, is greater than 90° (specifically, generally 135°). As a result, in the liquid crystal domain B, when a voltage is applied, the dark line DL6 occurs, extending parallel to the edge portion EG2.

Likewise, at an edge portion EG3 (the lower half of the right edge SD3) of the edges of the pixel electrode 911 that are located close to the liquid crystal domain C, the angle between the azimuth angle direction e3 that is perpendicular to the edge portion EG3 and points toward the inside of the pixel electrode 911, and the tilt direction t3 of the liquid crystal domain C, is greater than 90° (specifically, generally 135°). As a result, in the liquid crystal domain C, when a voltage is applied, the dark line DL7 occurs, extending parallel to the edge portion EG3.

Likewise, at an edge portion EG4 (the right half of the upper edge SD4) of the edges of the pixel electrode 911 that are located close to the liquid crystal domain D, the angle between the azimuth angle direction e4 that is perpendicular to the edge portion EG4 and points toward the inside of the pixel electrode 911, and the tilt direction t4 of the liquid crystal domain D, is greater than 90° (specifically, generally 135°). As a result, in the liquid crystal domain D, when a voltage is applied, the dark line DL8 occurs, extending parallel to the edge portion EG4.

Figure 39:
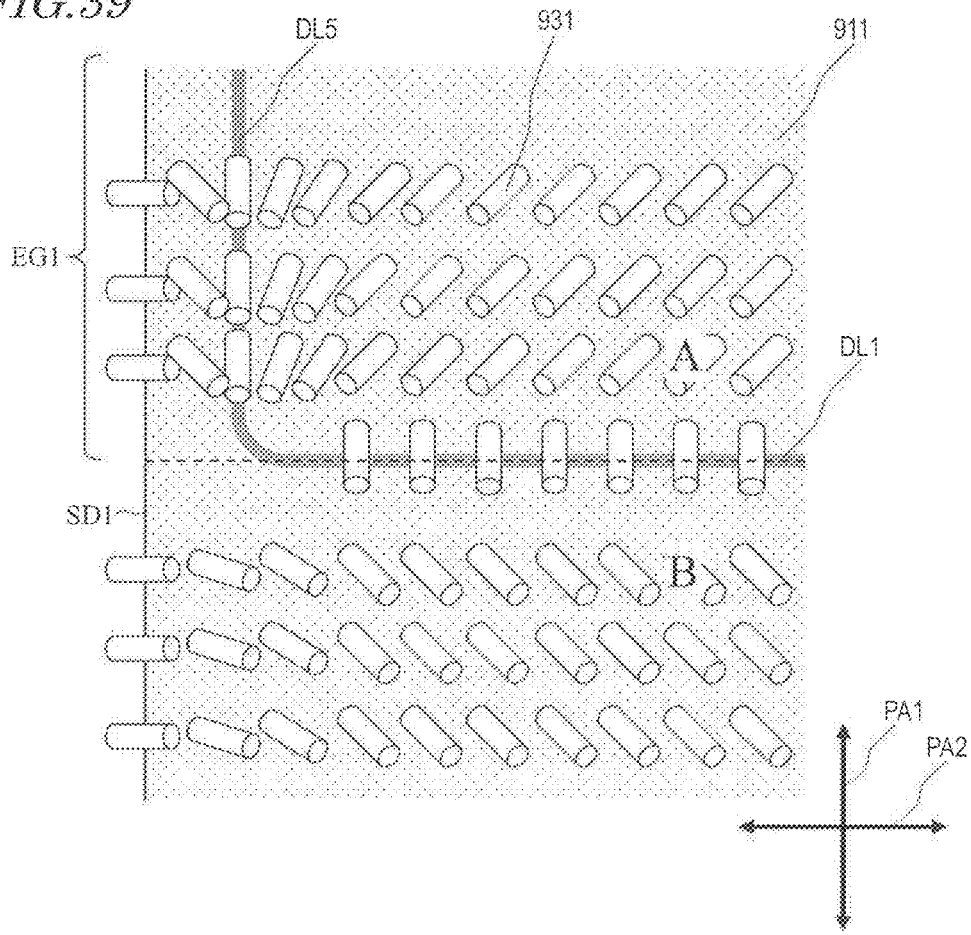
FIG. 39 is a plan view showing an aligned state of liquid crystal molecules 931 near an edge SD1 of a pixel electrode 911.

FIG. 39 shows an aligned state of liquid crystal molecules 931 near the edge SD1. As shown in FIG. 39, near the edge portion EG1 of the edge SD1, the alignment continuously changes from a direction (about 0° direction) perpendicular to the edge SD1 to the tilt direction t1 (about 225° direction) of the liquid crystal domain A, so that there is a region where liquid crystal molecules 931 are oriented in a direction (about 270° direction) that is substantially parallel or substantially perpendicular to the transmission axes PA1 and PA2 of the pair of polarizing plates. This region is the dark line DL5.

In contrast to this, near the portion other than the edge portion EG1 of the edge SD1, the alignment continuously changes from a direction (about 0° direction) perpendicular to the edge SD1 to the tilt direction t2 (about 315° direction) of the liquid crystal domain B, and there is not a region where liquid crystal molecules 931 are oriented in a direction that is substantially parallel or substantially perpendicular to the transmission axes PA1 and PA2 of the pair of polarizing plates. Therefore, a dark line does not occur.

For a similar reason, for the other edges SD2, SD3, and SD4, the dark lines DL6, DL7, and DL8 occur near the edge portions EG2, EG3, and EG4, and a dark line does not occur near the portions other than the edge portions EG2, EG3, and EG4.

The dark line generated by the above mechanism causes a decrease in pixel transmittance. In a liquid crystal display apparatus according to an embodiment of the present invention that has a configuration described below, the area of the dark line occurring in a pixel can be reduced. In addition, in a liquid crystal display apparatus according to an embodiment of the present invention, none of the problems with the configurations of Patent Document Nos. 2, 3, and 4 (a decrease in display quality due to fixation of disturbed alignment to a quasi-stable state due to pressing with a finger or changing of images) arises. Therefore, according to an embodiment of the present invention, the transmittance can be improved without a decrease in display quality.

Embodiments of the present invention will now be described with reference to the accompanying drawings. Note that the present invention is in no way limited to embodiments described below.

First Embodiment

Figure 1:
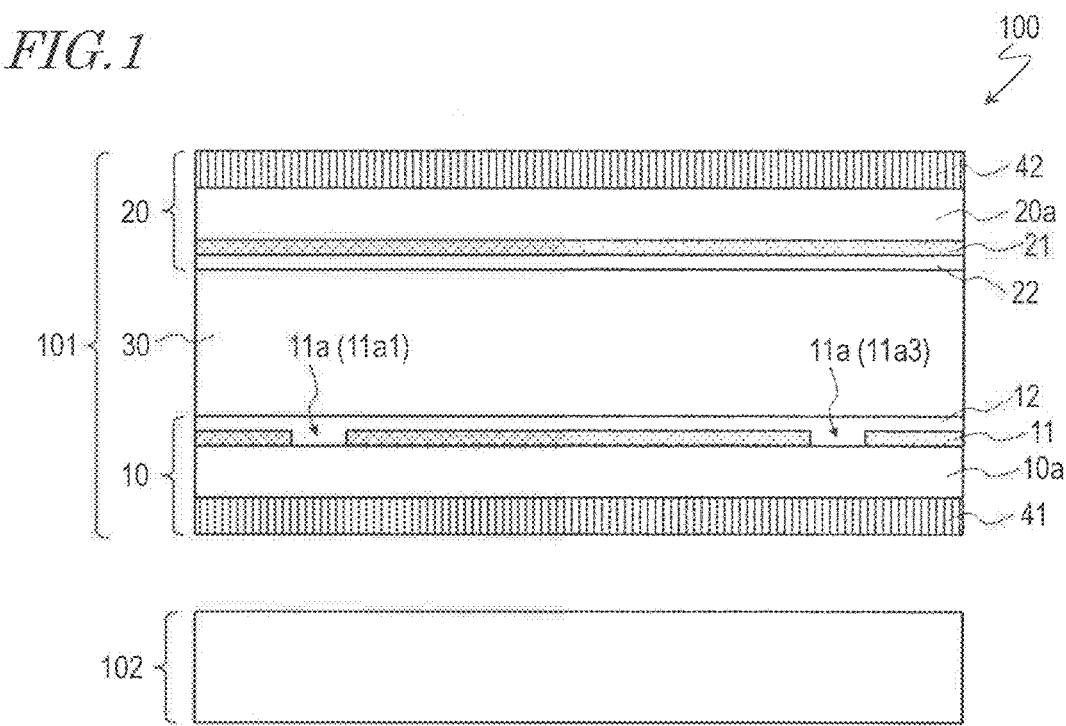
FIG. 1 is a cross-sectional view schematically showing a liquid crystal display apparatus 100 according to an embodiment of the present invention, and showing a cross-section taken along line 1A-1A' of FIG. 2.
Figure 2:
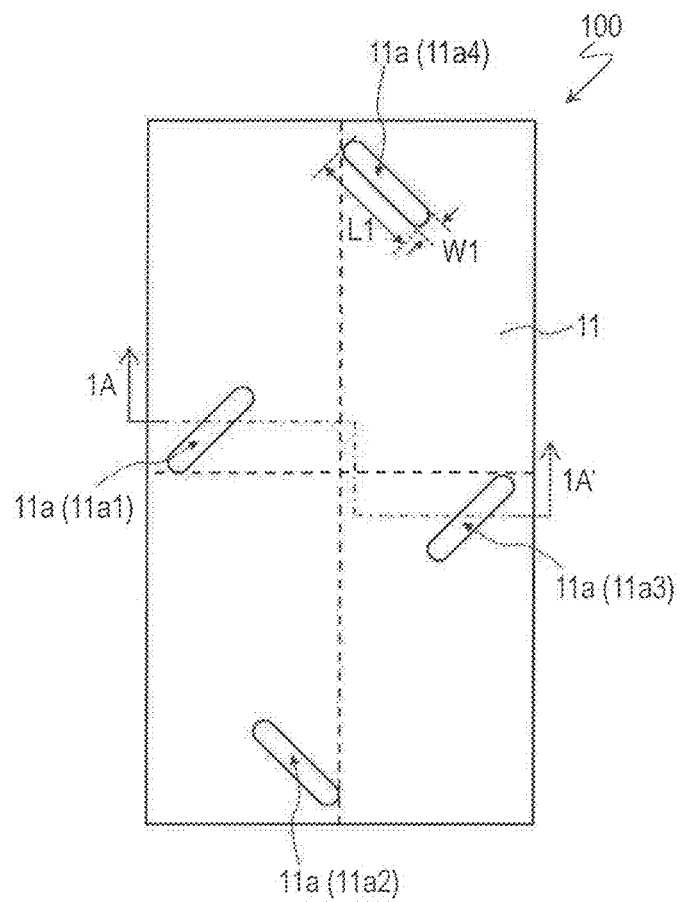
FIG. 2 is a plan view schematically showing the liquid crystal display apparatus 100.

A liquid crystal display apparatus 100 according to this embodiment will be described with reference to FIGS. 1 and 2. FIGS. 1 and 2 are a cross-sectional view and a plan view, respectively, schematically showing the liquid crystal display apparatus 100. FIG. 1 is a cross-sectional view taken along line 1A-1A' of FIG. 2.

As shown in FIG. 1, the liquid crystal display apparatus 100 includes a liquid crystal display panel 101 and a backlight (illumination device) 102. The liquid crystal display panel 101 has an active matrix substrate (first substrate) 10 and a counter substrate (second substrate) 20 that face each other, and a vertical alignment mode liquid crystal layer 30 that is provided therebetween. The backlight 102 is provided at the back of the liquid crystal display panel 101 (opposite side from a viewer). The liquid crystal display apparatus 100 also has a plurality of pixels arranged in a matrix including a plurality of rows and a plurality of columns.

The active matrix substrate 10 has a pixel electrode 11 provided for each of the plurality of pixels, and a first photo alignment film 12 provided between the pixel electrodes 11 and the liquid crystal layer 30 (i.e., on the frontmost surface closer to the liquid crystal layer 30 of the active matrix substrate 10). The counter substrate 20 has a counter electrode 21 facing the pixel electrodes 11, and a second photo alignment film 22 provided between the counter electrode 21 and the liquid crystal layer 30 (i.e., on the frontmost surface closer to the liquid crystal layer 30 of the counter substrate 20). The pixel electrodes 11 and the counter electrode 21 are formed of a transparent conductive material (e.g., ITO). The first photo alignment film 12 and the second photo alignment film 22 each have an alignment control force that causes liquid crystal molecules to be oriented substantially perpendicularly to a surface thereof.

A configuration of each of the active matrix substrate 10 and the counter substrate 20 will now be more specifically described.

The pixel electrodes 11 and the first photo alignment film 12 of the active matrix substrate 10 are provided in this order on the surface closer to the liquid crystal layer 30 of a substrate 10a. In other words, the pixel electrodes 11 and the first photo alignment film 12 are supported by the substrate 10a. The substrate 10a is transparent and has insulating properties. The substrate 10a is, for example, a glass substrate or plastic substrate.

In this embodiment, as shown in FIGS. 1 and 2, the pixel electrode 11 has a plurality of (here, four) slits 11a (11a1-11a4). The plurality of slits 11a are formed in a partial region of the pixel electrode 11 (i.e., not formed throughout the pixel electrode 11). A slit 11a is formed in a region corresponding to each of the four liquid crystal domains formed by alignment division. In FIG. 2, a boundary between adjacent liquid crystal domains is represented by a dashed line. A specific arrangement of the slits 11a will be described in detail below.

Figure 3:
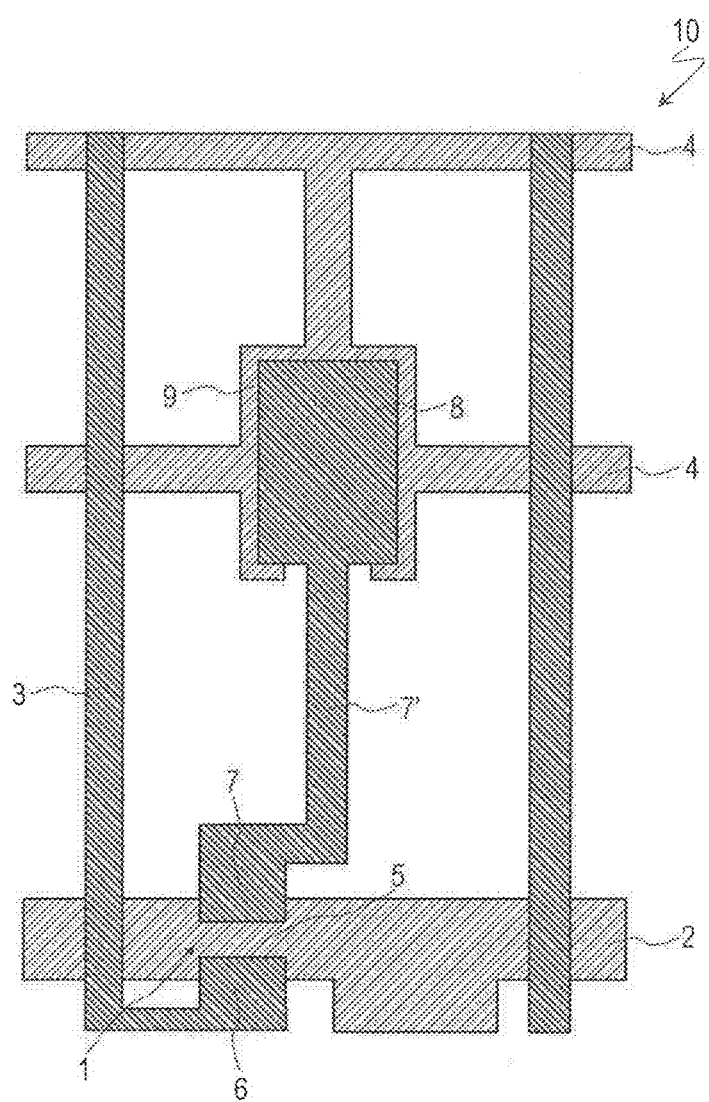
FIG. 3 is a plan view showing an example interconnection structure of an active matrix substrate 10.

The active matrix substrate 10 has, in addition to the pixel electrodes 11 and the first photo alignment film 12 described above, a thin-film transistor (TFT) provided for each pixel, scan lines and signal lines for supplying a scan signal and a display signal to the TFTs, etc. FIG. 3 shows an example interconnection structure of the active matrix substrate 10. FIG. 3 shows an interconnection structure of a region corresponding to a pixel.

As shown in FIG. 3, the active matrix substrate 10 further has a TFT 1, a scan line (gate line) 2 extending in the row direction, a signal line (source line) 3 extending in the column direction, and a storage capacitor line 4 extending in the row direction.

The TFT 1 has a gate electrode 5, a semiconductor layer (not shown), a source electrode 6, and a drain electrode 7. The gate electrode 5 is electrically connected to the gate line 2. In the example of FIG. 3, the gate electrode 5 and the gate line 2 are integrally formed, and a portion (a portion overlapping the semiconductor layer with a gate insulating layer (not shown) interposed therebetween) of the gate line 2 functions as the gate electrode 5. The source electrode 6 is electrically connected to the source line 3. In the example of FIG. 3, the source electrode 5 is a branch portion extending from the source line 3. The drain electrode 7 is electrically connected to the pixel electrode 11. In the example of FIG. 3, a connecting portion 7' is extended from the drain electrode 7. The drain electrode 7 is connected to a storage capacitor electrode 8 by the connecting portion 7'. The storage capacitor electrode 8 is connected to the pixel electrode 11 in a contact hole formed in an interlayer insulating layer (not shown) provided on the storage capacitor electrode 8. Therefore, the drain electrode 7 is electrically connected to the pixel electrode 11 through the storage capacitor electrode 8 and the connecting portion 7'.

The storage capacitor electrode 8 faces a storage capacitor counter electrode 9 with the gate insulating layer interposed therebetween. The storage capacitor counter electrode 9 is electrically connected to the storage capacitor line 4. In the example of FIG. 3, the storage capacitor counter electrode 9 and the storage capacitor line 4 are integrally formed. More specifically, the storage capacitor line 4 is formed such that a portion thereof is wider than the other portion, and that portion functions as the storage capacitor counter electrode 9. The storage capacitor electrode 8 and the storage capacitor counter electrode 9, and the gate insulating layer located therebetween, together form a storage capacitor.

Note that the interconnection structure of the active matrix substrate 10 is not limited to the example of FIG. 3.

As shown in FIG. 1, the counter electrode 21 and the second photo alignment film 22 of the counter substrate 20 are provided in this order on the surface closer to the liquid crystal layer 30 of a substrate 20a. In other words, the counter electrode 21 and the second photo alignment film 22 are supported by the substrate 20a. The substrate 20a is transparent and has insulating properties. The substrate 20a is, for example, a glass substrate or plastic substrate.

Although not shown, the counter substrate 20 has a color filter layer and a light blocking layer (black matrix) in addition to the counter electrode 21 and the second photo alignment film 22 described above. The color filter layer typically includes a red color filter, a green color filter, and a blue color filter.

The liquid crystal display apparatus 100 further includes a pair of polarizing plates 41 and 42 facing each other with the liquid crystal layer 30 interposed therebetween. The pair of polarizing plates 41 and 42 are arranged so that their transmission axes are substantially orthogonal (i.e., in crossed Nicols).

Next, the alignment division structure of a pixel P of the liquid crystal display apparatus 100 of this embodiment will be described with reference to FIG. 4.

Figure 4:
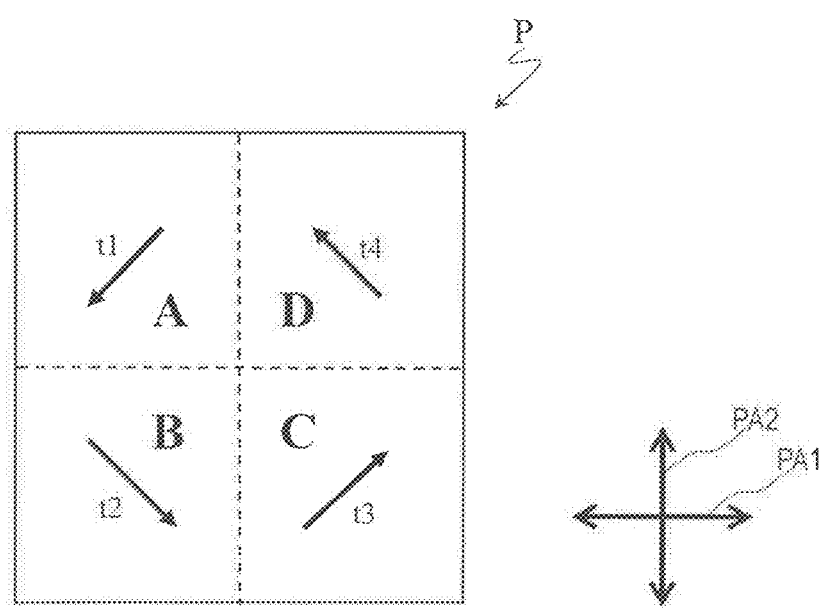
FIG. 4 is a diagram showing an alignment division structure of a pixel P in the liquid crystal display apparatus 100.

As shown in FIG. 4, when a voltage is applied between the pixel electrode 11 and the counter electrode 21, four liquid crystal domains A, B, C, and D are formed in the liquid crystal layer 30 in each pixel P. The four liquid crystal domains A, B, C, and D are arranged in a 2×2 matrix so that each liquid crystal domain is adjacent to the other liquid crystal domains. The four directors (reference alignment directions) t1, t2, t3, and t4 that are the representative alignment directions of liquid crystal molecules contained in the liquid crystal domains A, B, C, and D, respectively, have different azimuths.

Assuming that the azimuth angle of the horizontal direction (3 o'clock direction) of the display plane is 0°, the azimuth of the director t1 of the liquid crystal domain A is an about 225° direction, the azimuth of the director t2 of the liquid crystal domain B is an about 315° direction, the azimuth of the director t3 of the liquid crystal domain C is an about 45° direction, and the azimuth of the director t4 of the liquid crystal domain D is an about 135° direction. In other words, any two of the azimuths of the four directors of the liquid crystal domains A, B, C, and D is substantially equal to an integer multiple of 90°. In addition, the liquid crystal domains A, B, C, and D are arranged so that the azimuths of the directors of adjacent liquid crystal domains are about 90° different from each other.

One of the transmission axes (polarization axes) PA1 and PA2 of the pair of polarizing plates 41 and 42 is parallel to the horizontal direction of the display plane, and the other is parallel to the vertical direction of the display plane. Therefore, the angles between the transmission axes (polarization axes) PA1 and PA2 of the pair of polarizing plates 41 and 42 and the azimuths of the directors t1, t2, t3, and t4 of the liquid crystal domains A, B, C, and D are about 45°.

Although FIG. 4 shows an example in which the four liquid crystal domains A, B, C, and D have equal areas in the pixel P, the areas of the four liquid crystal domains A, B, C, and D may not be equal to each other. Note that the differences in area between the four liquid crystal domains A, B, C, and D are preferably reduced to the extent possible in terms of uniformity of viewing angle characteristics. In the example of FIG. 4, the example four-domain structure is most preferable (i.e., ideal) in terms of viewing angle characteristics.

Figure 5:
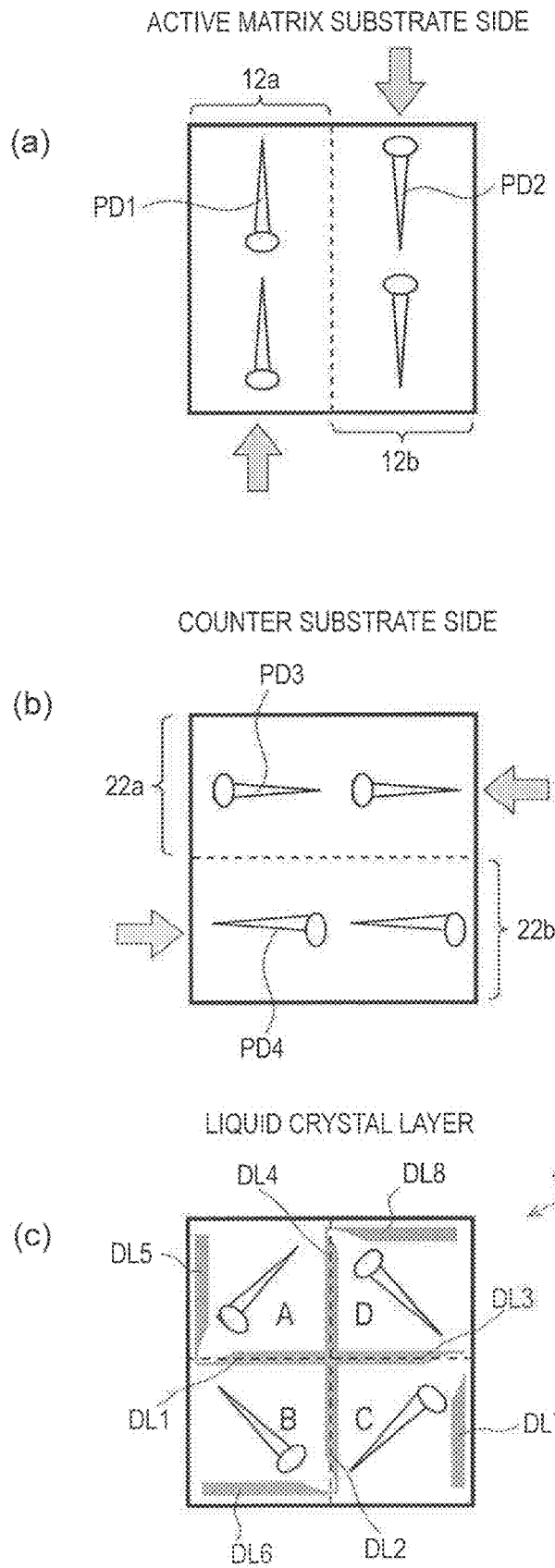
FIGS. 5(a), 5(b), and 5(c) are diagrams for describing a method for obtaining the alignment division structure of the pixel P of FIG. 4.

Next, an alignment division method for obtaining the alignment division structure of the pixel P will be described with reference to FIGS. 5(a), 5(b), and 5(c). FIG. 5(a) shows pretilt directions PD1 and PD2 that are defined by the first photo alignment film 12 provided on the active matrix substrate 10. FIG. 5(b) shows pretilt directions PD3 and PD4 that are defined by the second photo alignment film 22 provided on the counter substrate 20. FIG. 5(c) shows tilt directions (directors) when a voltage is applied to the liquid crystal layer 30 after the active matrix substrate 10 and the counter substrate 20 are attached together.

As shown in FIG. 5(a), the first photo alignment film 12 has, in each pixel P, a first pretilt region 12a that defines the first pretilt direction PD1, and a second pretilt region 12b that defines the second pretilt direction PD2 antiparallel to the first pretilt direction PD1. Specifically, the region corresponding to a pixel P of the first photo alignment film 12 is vertically divided into two regions. These regions (first and second pretilt regions) 12a and 12b are subjected to a photo alignment treatment so as to be able to define the antiparallel pretilt directions (first and second pretilt directions) PD1 and PD2. Here, the photo alignment treatment is carried out by oblique irradiation with ultraviolet light (e.g., linear polarized ultraviolet light) in directions indicated by arrows.

As shown in FIG. 5(b), the second photo alignment film 22 has, in each pixel P, a third pretilt region 22a that defines the third pretilt direction PD3 that is substantially orthogonal to the first pretilt direction PD1 and the second pretilt direction PD2, and a fourth pretilt region 22b that defines the fourth pretilt direction PD4 antiparallel to the third pretilt direction PD3. Specifically, a region corresponding to a pixel P of the second photo alignment film 22 is horizontally divided into two regions. These regions (third and fourth pretilt regions) 22a and 22b are subjected to a photo alignment treatment so as to be able to define the antiparallel pretilt directions (third and fourth pretilt directions) PD3 and PD4. Here, the photo alignment treatment is carried out by oblique irradiation with ultraviolet light (e.g., linear polarized ultraviolet light) in directions indicated by arrows.

By attaching together the active matrix substrate 10 and the counter substrate 20 subjected to the photo alignment treatments of FIGS. 5(a) and 5(b), an alignment division pixel P can be formed as shown in FIG. 5(c). In each of the liquid crystal domains A-D, the pretilt direction defined by the first photo alignment film 12 on the active matrix substrate 10 is about 90° different from the pretilt direction defined by the second photo alignment film 22 on the counter substrate 20. As can be seen from FIG. 5(c), tilt directions (reference alignment directions) that are an intermediate direction between the two pretilt directions are defined. In addition, a boundary between the first pretilt region 12a and the second pretilt region 12b, and a boundary between the third pretilt region 22a and the fourth pretilt region 22b, are boundaries (domain boundaries) between adjacent ones of the four liquid crystal domains A, B, C, and D.

In the pixel P having the alignment division structure, dark lines DL1-DL8 occur. Specifically, dark lines DL1-DL4 occur at boundaries between adjacent liquid crystal domains, and dark lines DL5-DL8 occur near edges of the pixel electrode 11. An intersection between the dark lines DL1 and DL5, an intersection between the dark lines DL2 and DL6, an intersection between the dark lines DL3 and DL7, and an intersection between the dark lines DL4 and DL8, are hereinafter referred to as a "bent portion" of a dark line. In the liquid crystal display apparatus 100 of this embodiment, as shown in FIG. 5(c), the area of a dark line can be reduced at and near the bent portion. The reason for this will now be described.

Figure 6:
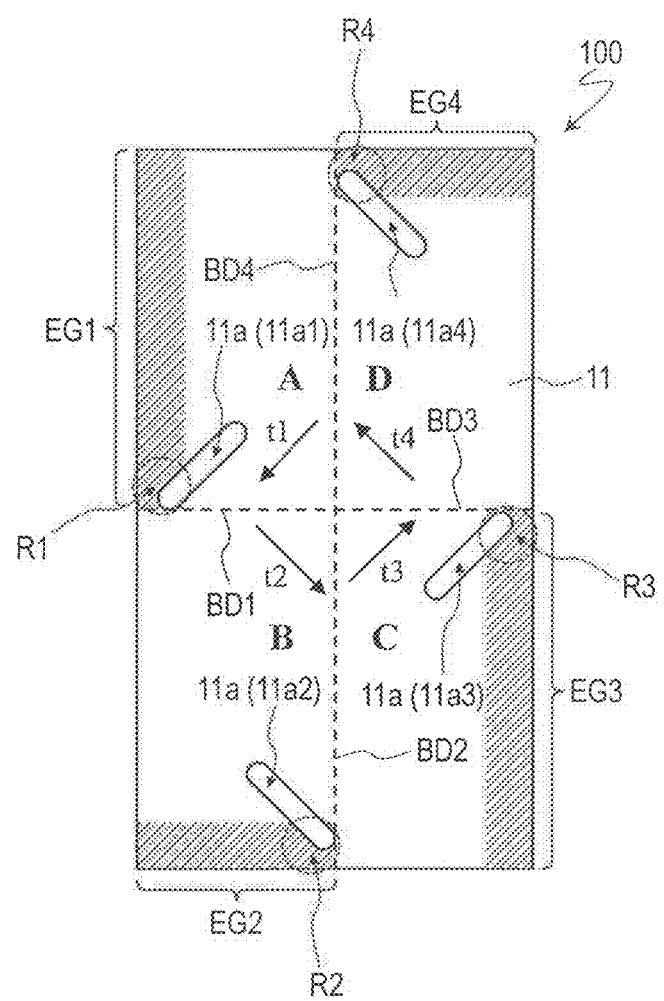
FIG. 6 is a plan view schematically showing the liquid crystal display apparatus 100.

As shown in FIG. 6, the pixel electrode 11 has four edge portions EG1, EG2, EG3, and EG4, near which the dark lines DL5-DL8 may occur.

Of a region near the edge portion EG1 located close to the liquid crystal domain A (a region where the dark line DL5 occurs, indicated by hatching in FIG. 6), a region R1 where a boundary BD1 between the liquid crystal domain A and the liquid crystal domain B intersects with the edge portion EG1 corresponds to the bent portion of a dark line (an intersection between the dark line DL1 and the dark line DL5). The region R1 is hereinafter referred to as a "first bending region" (or simply as a "bending region").

The pixel electrode 11 has a slit 11a1 at or near the first bending region R1. The slit 11a1 extends substantially parallel to the reference alignment direction t1 of the liquid crystal domain A. The pixel electrode 11 does not have a slit, except for the slit 11a1, in a region near the edge portion EG1. In other words, only one slit 11a1 is formed in the region where the dark line DL5 occurs.

Because the slit 11a1 is provided extending substantially parallel to the reference alignment direction t1 of the liquid crystal domain A, an increased number of liquid crystal molecules are oriented substantially parallel to the reference alignment direction t1 in and near the first bending region R1 (the probability that such an oriented liquid crystal molecule is present is increased). Therefore, the area of the dark line decreases at the bent portion (an intersection between the dark line DL1 and the dark line DL5).

Of a region near the edge portion EG2 located close to the liquid crystal domain B (a region where the dark line DL6 occurs, indicated by hatching in FIG. 6), a region R2 where a boundary BD2 between the liquid crystal domain B and the liquid crystal domain C intersects with the edge portion EG2 corresponds to the bent portion of a dark line (an intersection between the dark line DL2 and the dark line DL6). The region R2 is hereinafter referred to as a "second bending region" (or simply as a "bending region").

The pixel electrode 11 has a slit 11a2 at or near the second bending region R2. The slit 11a2 extends substantially parallel to the reference alignment direction t2 of the liquid crystal domain B. The pixel electrode 11 does not have a slit, except for the slit 11a2, in a region near the edge portion EG2. In other words, only one slit 11a2 is formed in the region where the dark line DL6 occurs.

Because the slit 11a2 is provided extending substantially parallel to the reference alignment direction t2 of the liquid crystal domain B, an increased number of liquid crystal molecules are oriented substantially parallel to the reference alignment direction t2 in and near the second bending region R2 (the probability that such an oriented liquid crystal molecule is present is increased). Therefore, the area of the dark line decreases at the bent portion (an intersection between the dark line DL2 and the dark line DL6).

Of a region near the edge portion EG3 located close to the liquid crystal domain C (a region where the dark line DL7 occurs, indicated by hatching in FIG. 6), a region R3 where a boundary BD3 between the liquid crystal domain C and the liquid crystal domain D intersects with the edge portion EG3 corresponds to the bent portion of a dark line (an intersection between the dark line DL3 and the dark line DL7). The region R3 is hereinafter referred to as a "third bending region" (or simply as a "bending region").

The pixel electrode 11 has a slit 11a3 at or near the third bending region R3. The slit 11a3 extends substantially parallel to the reference alignment direction t3 of the liquid crystal domain C. The pixel electrode 11 does not have a slit, except for the slit 11a3, in a region near the edge portion EG3. In other words, only one slit 11a3 is formed in the region where the dark line DL7 occurs.

Because the slit 11a3 is provided extending substantially parallel to the reference alignment direction t3 of the liquid crystal domain C, an increased number of liquid crystal molecules are oriented substantially parallel to the reference alignment direction t3 in and near the third bending region R3 (the probability that such an oriented liquid crystal molecule is present is increased). Therefore, the area of the dark line decreases at the bent portion (an intersection between the dark line DL3 and the dark line DL7).

Of a region near the edge portion EG4 located close to the liquid crystal domain D (a region where the dark line DL8 occurs, indicated by hatching in FIG. 6), a region R4 where a boundary BD4 between the liquid crystal domain D and the liquid crystal domain A intersects with the edge portion EG4 corresponds to the bent portion of a dark line (an intersection between the dark line DL4 and the dark line DL8). The region R4 is hereinafter referred to as a "fourth bending region" (or simply as a "bending region").

The pixel electrode 11 has a slit 11a4 at or near the fourth bending region R4. The slit 11a4 extends substantially parallel to the reference alignment direction t4 of the liquid crystal domain D. The pixel electrode 11 does not have a slit, except for the slit 11a4, in a region near the edge portion EG4. In other words, only one slit 11a4 is formed in the region where the dark line DL8 occurs.

Because the slit 11a4 is provided extending substantially parallel to the reference alignment direction t4 of the liquid crystal domain D, an increased number of liquid crystal molecules are oriented substantially parallel to the reference alignment direction t4 in and near the fourth bending region R4 (the probability that such an oriented liquid crystal molecule is present is increased). Therefore, the area of the dark line decreases at the bent portion (an intersection between the dark line DL4 and the dark line DL8).

As described above, in the liquid crystal display apparatus 100 of this embodiment, the pixel electrode 11 has the slits 11a1-11a4 at or near the bending regions R1-R4 (regions near the edge portions EG1-EG4 that correspond to the bent portions of the dark lines), and therefore, the areas of the dark lines can be reduced at the bent portions (regions having a greatest loss in transmittance). Therefore, the transmittance can be improved.

The result of a test on the transmittance improving effect that was carried out by an alignment simulation based on actually measured values, will now be described. The simulation was carried out using a specialized liquid crystal simulator software application.

Figure 7:
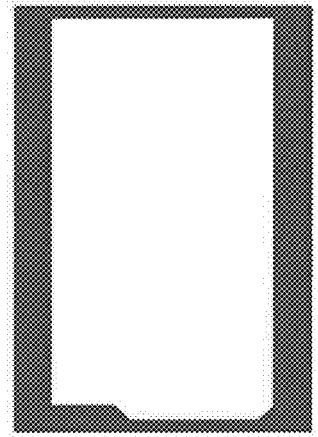
FIGS. 7(a), 7(b), and 7(c) are diagrams showing the results of an alignment simulation on Comparative Example 1.
Figure 7:
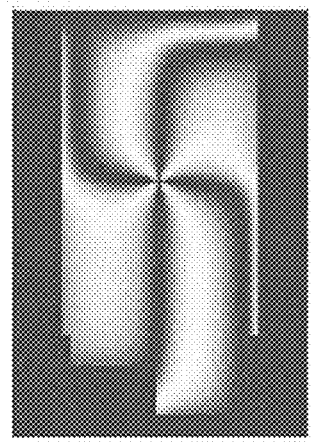
Figure 7:
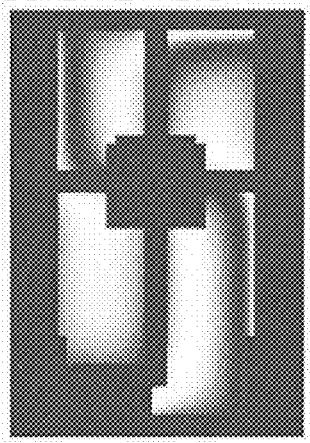
Figure 8:
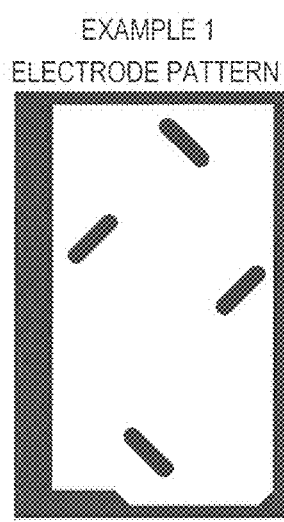
FIGS. 8(a), 8(b), and 8(c) are diagrams showing the results of an alignment simulation on Example 1.
Figure 8:
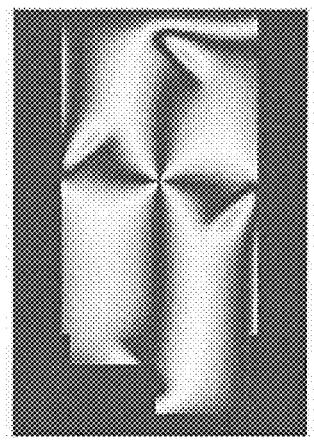
Figure 8:
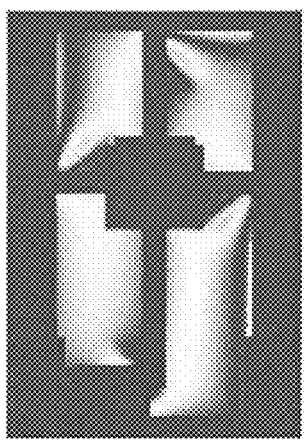

FIGS. 7(a), 7(b), and 7(c) show test results obtained when a slit is not formed in the pixel electrode (Comparative Example 1). FIGS. 8(a), 8(b), and 8(c) show test results obtained when slits 11a1-11a4 are formed in the pixel electrode 11 as in this embodiment (Example 1). FIGS. 7(a) and 8(a) show electrode patterns used in the respective tests. FIGS. 7(b) and 7(c) and FIGS. 8(b) and 8(c) show test results obtained when a transmittance distribution in a pixel during white display was calculated by a simulation. FIGS. 7(b) and 8(b) show the case where no electrodes (a storage capacitor electrode, etc.) or interconnects (a storage capacitor line, etc.) are provided in the pixel, except for the pixel electrode. FIGS. 7(c) and 8(c) show the case where interconnects, etc., are provided in the pixel.

The comparison between FIG. 7(b) and FIG. 8(b) and the comparison between FIG. 7(c) and FIG. 8(c) demonstrate that the areas of the dark lines at the bent portions are smaller in Example 1 than in Comparative Example 1. The ratio of the transmittance of Example 1 to the transmittance of Comparative Example 1 was 1.03 in the case where no interconnect or the like is present in the pixel, and 1.04 in the case where an interconnect and the like are present in the pixel. Thus, there is a 3-4% increase in transmittance.

Figure 9:
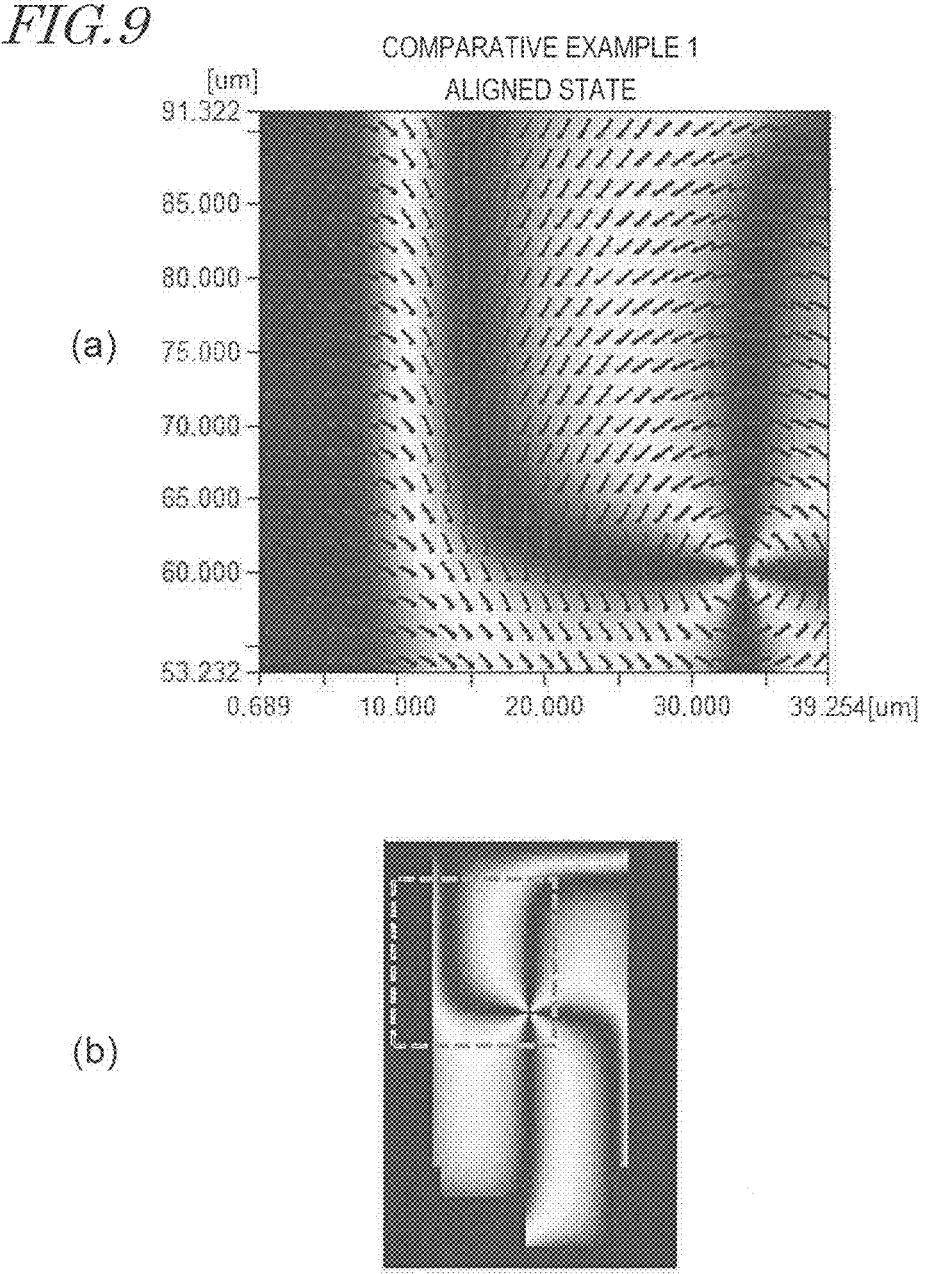
FIG. 9(a) is a diagram showing the result of obtaining an aligned state (alignment directions of liquid crystal molecules) in a pixel during white display by a simulation in Comparative Example 1.
FIG. 9(b) is a diagram showing the position of a region shown in FIG. 9(a) in the pixel.
Figure 10:
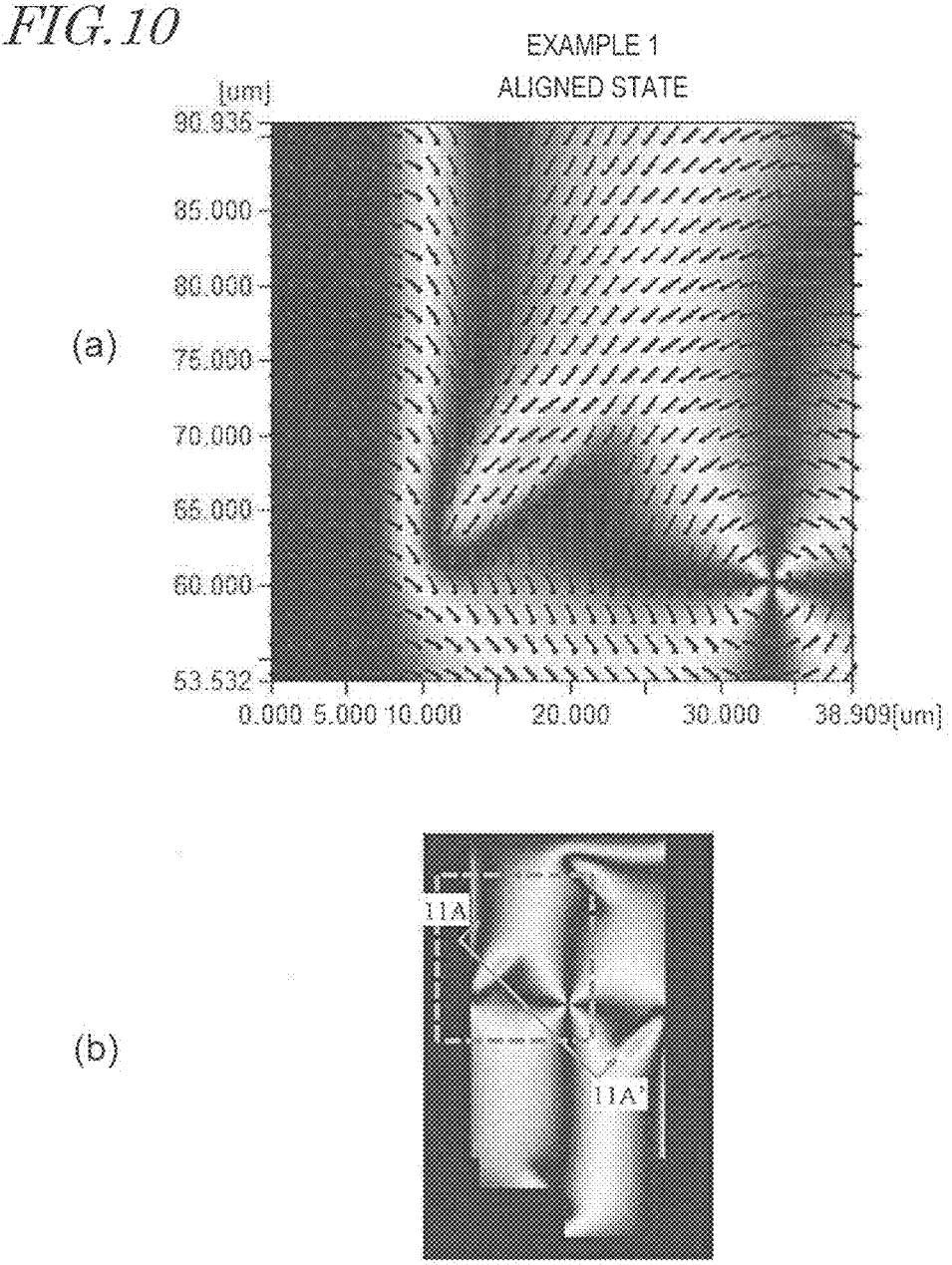
FIG. 10(a) is a diagram showing the result of obtaining an aligned state (alignment directions of liquid crystal molecules) in a pixel during white display by a simulation in Example 1.
FIG. 10(b) is a diagram showing the position of a region shown in FIG. 10(a) in the pixel.

FIGS. 9(a) and 10(a) show results of a simulation of an aligned state (alignment directions of liquid crystal molecules) in a pixel during white display for Comparative Example 1 and Example 1, respectively. FIGS. 9(a) and 10(a) are enlarged views of regions surrounded by dotted lines in FIGS. 9(b) and 10(b), respectively.

The comparison between FIG. 9(a) and FIG. 10(a) demonstrates that the number of liquid crystal molecules at and near the bent portions that are oriented in the reference alignment directions of the liquid crystal domains is greater in Example 1 than in Comparative Example 1, and therefore, the areas of the dark lines decreases.

Figure 11:
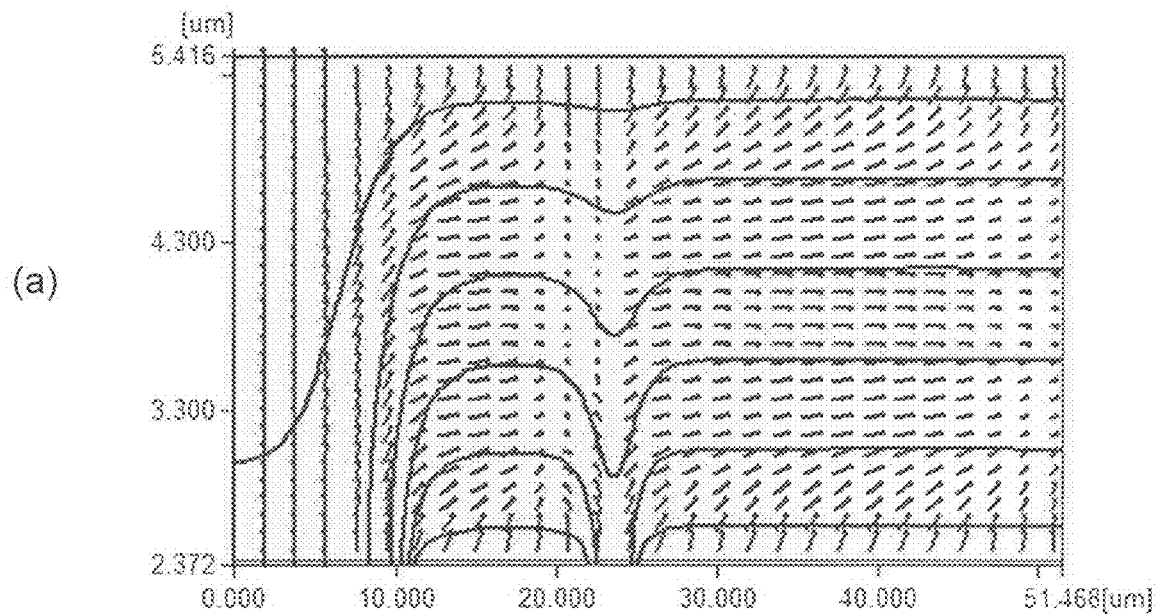
FIG. 11(a) is a diagram showing alignment directions of liquid crystal molecules and equipotential lines in a cross-section taken along line 11A-11A' of FIG. 10(b)
FIG. 11(b) is a diagram showing transmittance together with the alignment directions of liquid crystal molecules and equipotential lines.
Figure 11:
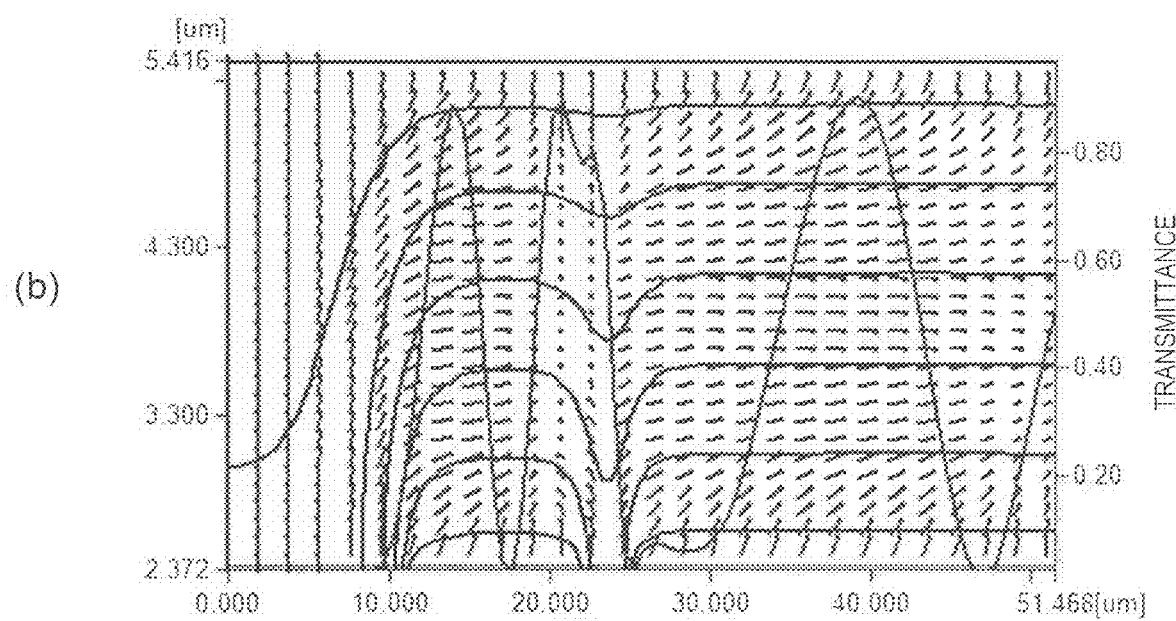

FIG. 11(a) shows alignment directions of liquid crystal molecules and equipotential lines in a cross-section taken along line 11A-11A' of FIG. 10(b) (a cross-section extending across the liquid crystal domain A and partially into the liquid crystal domain B, including a region where the slit 11a is formed). As can also be seen from FIG. 11(a), a large number of liquid crystal molecules in the region where the slit 11a is formed (a region where the equipotential line plunges) are oriented in the reference alignment direction of the liquid crystal domain A (the direction perpendicular to the drawing sheet of FIG. 11(a)).

FIG. 11(b) shows the transmittance together with the alignment directions of liquid crystal molecules and equipotential lines. As can be seen from FIG. 11(b), the region where the slit 11a is formed has a high transmittance.

According to the above test results, it was verified that the transmittance can be improved by forming the slits 11a1-11a4 in the pixel electrode 11.

In addition, as shown in FIG. 6, the pixel electrode 11 of the liquid crystal display apparatus 100 of this embodiment does not have a slit, except for the slits 11a1-11a4, in any of regions near the edge portions EG1-EG4. Therefore, in the liquid crystal display apparatus 100 of this embodiment, a decrease in display quality that occurs in the configurations (pixel electrode patterns) disclosed in Patent Document Nos. 2, 3, and 4 does not occur. The reason for this will now be described with reference to the pixel electrode patterns of Patent Document Nos. 2, 3, and 4.

Figure 12:
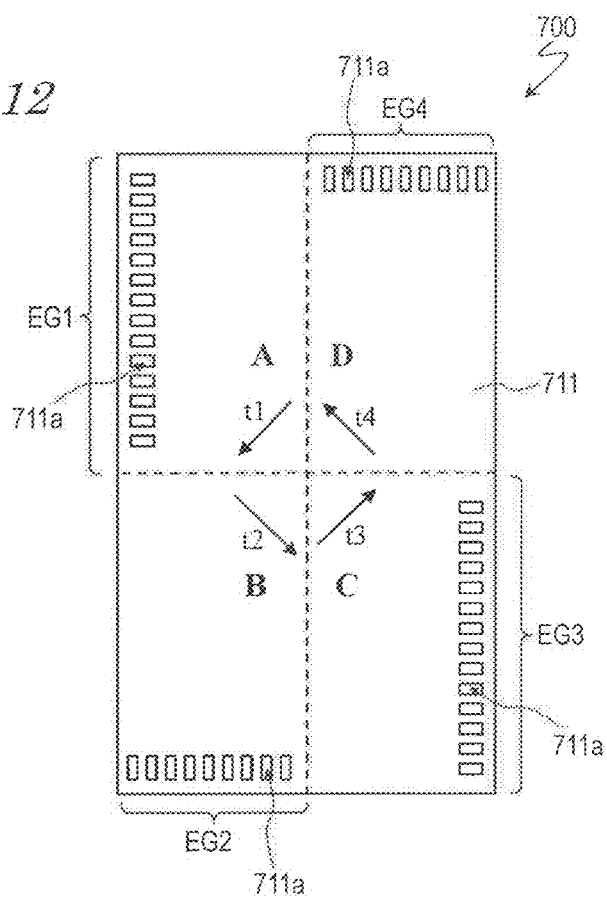
FIG. 12 is a plan view showing a liquid crystal display apparatus 700 according to Comparative Example 2.

FIG. 12 shows a liquid crystal display apparatus 700 according to Comparative Example 2. The liquid crystal display apparatus 700 of Comparative Example 2 has a pixel electrode 711 having a shape (pattern) disclosed in Patent Document No. 2.

The pixel electrode 711 of the liquid crystal display apparatus 700 has a plurality of slits 711a formed throughout a region near the edge portion EG1 located close to the liquid crystal domain A. Likewise, the pixel electrode 711 has a plurality of slits 711a throughout regions near the edge portions EG2, EG3, and EG4 located close to the liquid crystal domains B, C, and D. The plurality of slits 711a each extend in a direction perpendicular to the edge portion located close to the slit.

Figure 13:
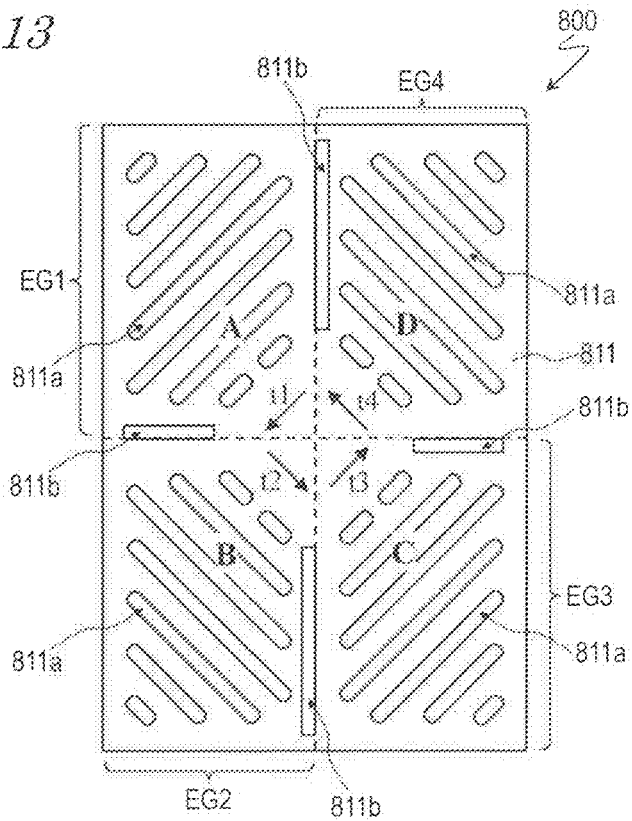
FIG. 13 is a plan view showing a liquid crystal display apparatus 800 according to Comparative Example 3.

FIG. 13 shows a liquid crystal display apparatus 800 according to Comparative Example 3. The liquid crystal display apparatus 800 of Comparative Example 3 has a pixel electrode 811 having a shape (pattern) disclosed in Patent Document No. 3.

The pixel electrode 811 of the liquid crystal display apparatus 800 has a plurality of main slits 811a formed throughout its region corresponding to the liquid crystal domain A. Likewise, the pixel electrode 811 has a plurality of main slits 811a formed throughout its regions corresponding to the liquid crystal domains B, C, and D. The plurality of slits 811a each extend parallel to the reference alignment direction of the corresponding liquid crystal domain.

The pixel electrode 811 also has a sub-slit 811b near a boundary between two adjacent liquid crystal domains. The sub-slits 811b extend parallel to the respective domain boundaries.

Figure 14:
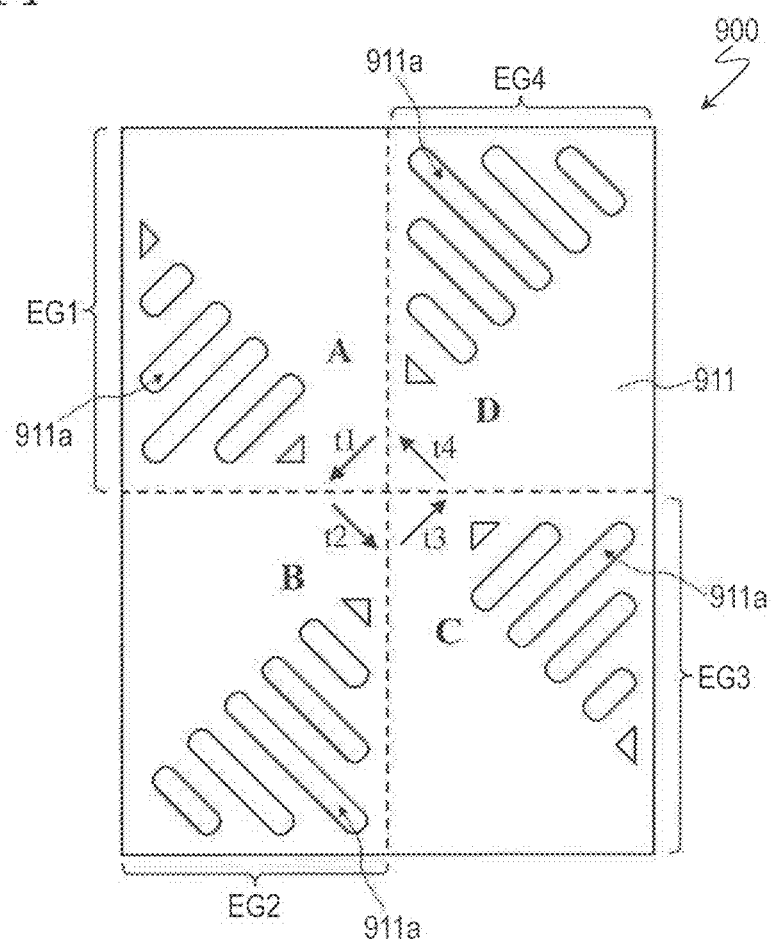
FIG. 14 is a plan view showing a liquid crystal display apparatus 900 according to Comparative Example 4.

FIG. 14 shows a liquid crystal display apparatus 900 according to Comparative Example 4. The liquid crystal display apparatus 900 of Comparative Example 4 has a pixel electrode 911 having a shape (pattern) disclosed in Patent Document No. 4.

The pixel electrode 911 of the liquid crystal display apparatus 900 has a plurality of slits 911a formed in its region corresponding to the liquid crystal domain A. Likewise, the pixel electrode 911 has a plurality of slits 911a formed in its regions corresponding to the liquid crystal domains B, C, and D. The plurality of slits 911a each extend parallel to the reference alignment direction of the corresponding liquid crystal domain. The plurality of slits 911a are also arranged so that ends on one side (inner ends) of the slits are aligned along a direction intersecting with the reference alignment direction in each liquid crystal domain.

In the liquid crystal display apparatuses 700, 800, and 900 of Comparative Examples 2, 3, and 4, the slits 711a, 811a, and 911a are formed in regions near the edge portions EG1-EG4, and therefore, it is considered that the areas of the dark lines can be reduced.

However, in the liquid crystal display apparatuses 800 and 900 of Comparative Examples 3 and 4, the directions in which the slits 811a and 911a extend are different from the pretilt directions defined by the photo alignment film on the active matrix substrate. Therefore, when the alignment is disturbed by pressing with a finger, the alignment is fixed to a quasi-stable state, so that a domain (a domain different from a liquid crystal domain which should be normally formed) occurs, which is visible as a trace.

Figure 15:
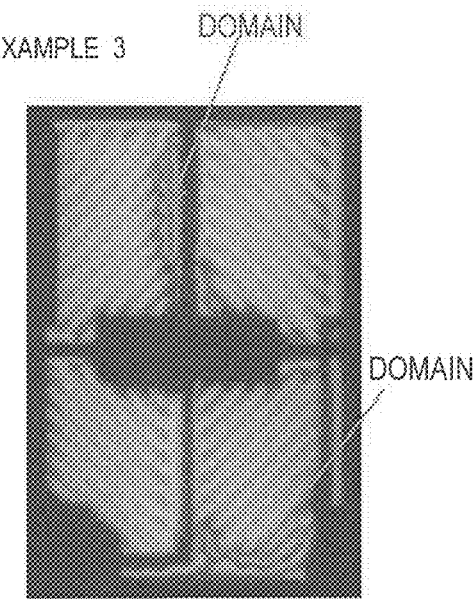
FIGS. 15(a) and 15(b) are microscopic images of a pixel observed after alignment is disturbed by pressing with a finger or the like, in the liquid crystal display apparatuses 800 and 900 of Comparative Examples 3 and 4 that were experimentally produced.
Figure 15:
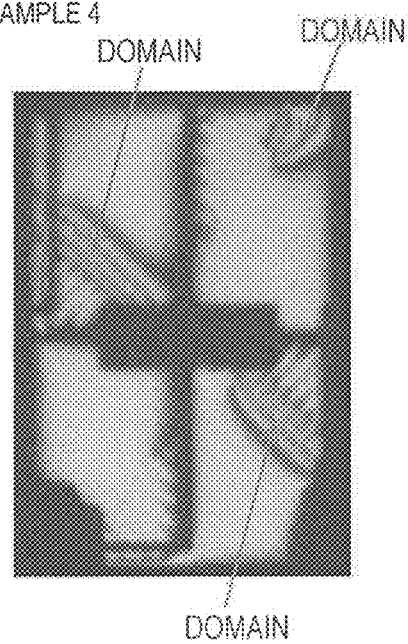

FIGS. 15(a) and 15(b) show microscopic images of a pixel observed after alignment is disturbed by pressing with a finger or the like, in the liquid crystal display apparatuses 800 and 900 of Comparative Examples 3 and 4 that were experimentally produced. As can be seen from FIGS. 15(a) and 15(b), domains which should not be normally formed are formed.

These domains mainly occur in regions where a dark line is not present. Therefore, if slits 711a are formed only in regions near the edge portions EG1-EG4 as in the liquid crystal display apparatus 700 of Comparative Example 2, the occurrence of a trace of pressing with a finger is reduced. However, in the liquid crystal display apparatus 700 of Comparative Example 2, the directions in which the slits 711a extend are different from the reference alignment directions of the liquid crystal domains, and therefore, the phenomenon that alignment is fixed to a quasi-stable state when images are changed occurs, which causes image persistence (ghost image). This problem is significant in high-definition liquid crystal display apparatuses such as 8K displays, i.e. in the case where the pixel size is small.

In contrast to this, as shown in FIG. 6, the pixel electrode 11 of the liquid crystal display apparatus 100 of this embodiment does not have a slit, except for the slits 11a1-11a4, in regions near the edge portions EG1-EG4 (i.e., a low slit arrangement density). Therefore, the occurrence of image persistence is reduced, and therefore, a decrease in display quality can be reduced.

As described above, according to the embodiment of the present invention, the transmittance of a VATN mode liquid crystal display apparatus can be improved without a decrease in display quality.

The effect of improving the transmittance by forming the slits 11a (11a1-11a4) can be further enhanced by setting lengths L1 (see FIG. 2) of the slits 11a within a particular range. Specifically, in the case where the liquid crystal layer 30 has a thickness (cell gap) of 2.5 µm or more and 3.5 µm or less, then if the lengths L1 of the slits 11a are 11 µm or more and 17 µm or less, the transmittance can be sufficiently improved.

Figure 16:
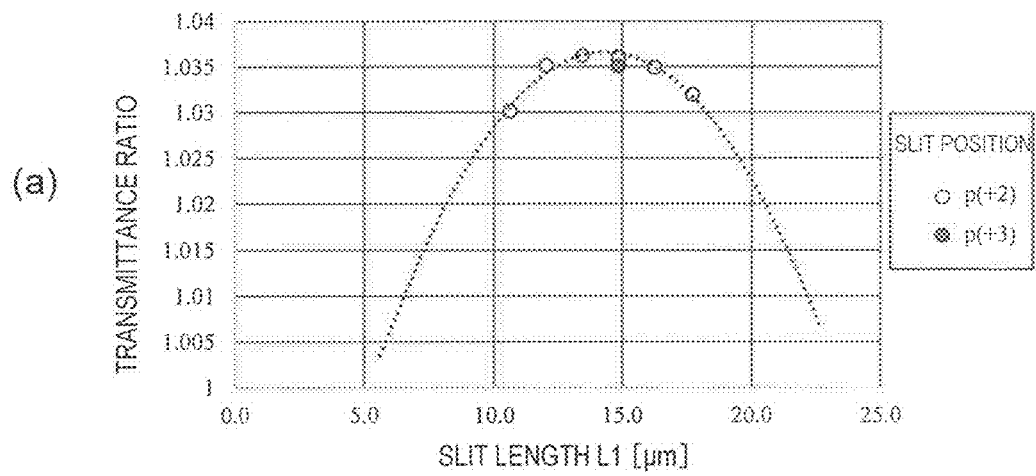
FIG. 16(a) is a graph showing a relationship between a length L1 of a slit 11a and a transmittance ratio.
FIGS. 16(b) and 16(c) are diagrams for describing a position (shift amount Δs) of the slit 11a, and FIG. 16(d) is a graph showing a relationship between the position of the slit 11a and the transmittance ratio.
Figure 16:
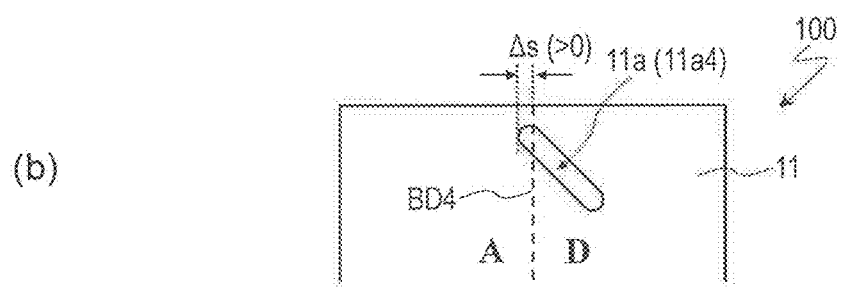
Figure 16:
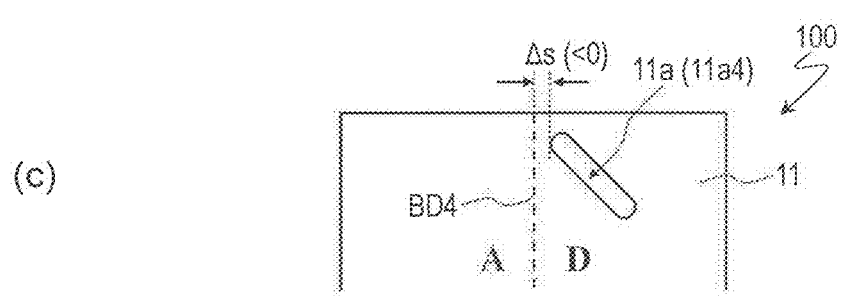
Figure 16:
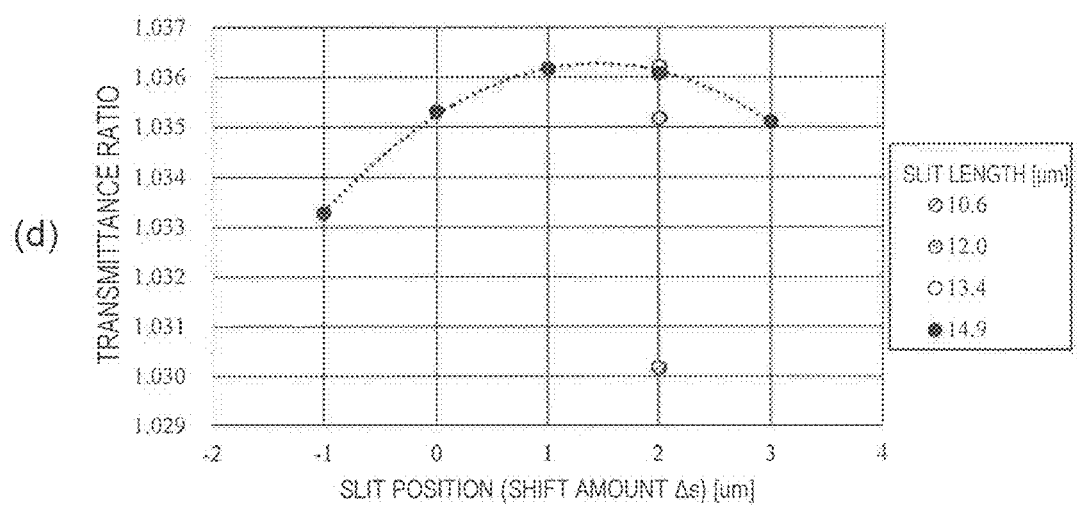

FIG. 16(a) shows a relationship between the lengths L1 of the slits 11a and the transmittance ratio (where the transmittance of Comparative Example 1 is 1.00) in the case where the liquid crystal layer has a thickness of 3 µm. As shown in FIG. 16(a), the transmittance ratio is highest in the case where the lengths L1 of the slits 11a are about 14 µm. As can also be seen from FIG. 16(a), the transmittance improving effect is high in the case where the lengths L1 of the slits 11a are 11 µm or more and 17 µm or less.

Note that FIG. 16(a) shows the transmittance ratio for two cases where the slits 11a are provided at different positions. As used herein, as shown in FIGS. 16(b) and 16(c), the "position of a slit 11a" is represented by a shift amount Δs of an outer end portion of the slit 11a from a domain boundary (the "position of a slit 11b" described below is similarly defined). The value of the shift amount Δs is positive in the case where the outer end portion of the slit 11a is shifted from a domain boundary to an adjacent liquid crystal domain as shown in FIG. 16(b), and is negative in the case where the outer end portion of the slit 11a is shifted to the opposite side as shown in FIG. 16(c). In the description that follows, the position of the slit 11a is represented by p(Δs) using the shift amount Δs [µm]. FIG. 16(a) shows the transmittance ratio for the cases where the position of the slit 11a is p(+2) and p(+3).

FIG. 16(d) shows a relationship between the position of the slit 11a (shift amount Δs) and the transmittance ratio. As can be seen from FIG. 16(d), the transmittance ratio varies depending on the position of the slit 11a. Specifically, the positive shift amount Δs (i.e., the slit 11a crosses a domain boundary) is preferable for improvement of the transmittance ratio.

Figure 17:
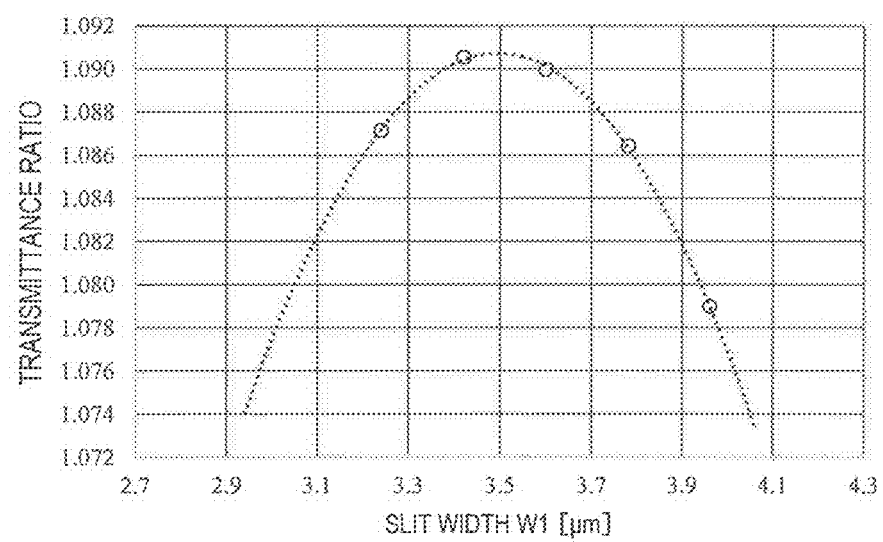
FIG. 17 is a graph showing a relationship between a width W1 of the slit 11a and the transmittance ratio.

The slit 11a (11a1-11a4) has a width W1 (see FIG. 2) of, for example, 3.5 µm, of course, without limitation. The width W1 of the slit 11a is typically 3 µm or more and 4 µm or less. FIG. 17 shows a relationship between the width W1 of the slit 11a and the transmittance ratio. As can be seen from FIG. 17, the transmittance ratio varies depending on the width W1 of the slit 11a. The width W1 of the slit 11a is preferably 3.3 µm or more and 3.7 µm or less for improvement of the transmittance ratio.

Note that the direction in which the slit 11a extends does not necessarily need to be exactly parallel to the reference alignment direction of the corresponding liquid crystal domain. The slit 11a is only required to improve the transmittance to substantially the same extent as when the slit 11a extends parallel to the reference alignment direction. For example, the angle between the direction in which the slit 11a extends and the reference alignment direction of the corresponding liquid crystal domain may be 5° or less.

For not all of the bending regions R1-R4, the slit 11a needs to be formed. The slit 11a may be removed from a portion of the bending regions. For example, in the case where light is blocked by an interconnect, a light blocking layer, etc., from entering some bending region, even if the slit 11a is formed in that bending region, the transmittance improving effect is not achieved, and therefore, the slit 11a may be removed from that bending region.

Second Embodiment

Figure 18:
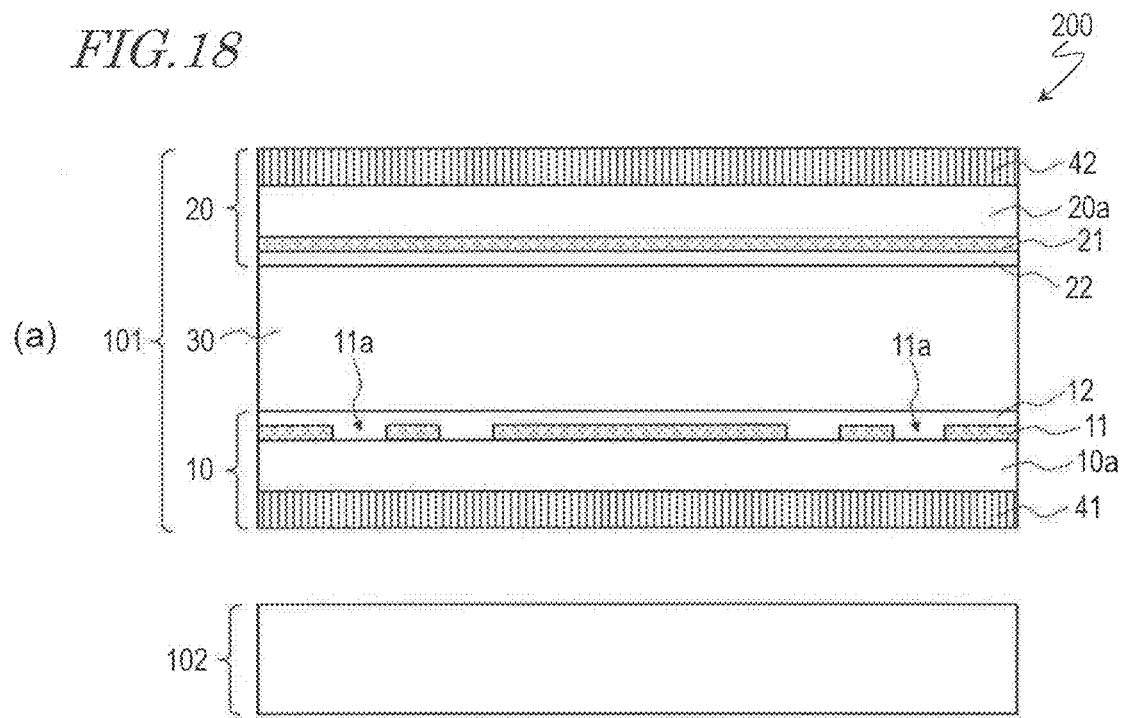
FIGS. 18(a) and 18(b) are a cross-sectional view and a plan view, respectively, schematically showing a liquid crystal display apparatus 200 according to an embodiment of the present invention.

A liquid crystal display apparatus 200 according to this embodiment will be described with reference to FIGS. 18(a) and 18(b). FIGS. 18(a) and 18(b) are a cross-sectional view and a plan view, respectively, schematically showing the liquid crystal display apparatus 200. FIG. 18(a) is a cross-sectional view taken along line 18A-18A' of FIG. 18(b). In the description that follows, differences between the liquid crystal display apparatus 200 and the liquid crystal display apparatus 100 of the first embodiment will mainly be described. Of the constituent elements of the liquid crystal display apparatus 200, constituent elements having the same functions as those of constituent elements of the liquid crystal display apparatus 100 are indicated by the same reference signs and will not be described (the same applies to the following embodiments).

As shown in FIGS. 18(a) and 18(b), the pixel electrode 11 of the liquid crystal display apparatus 200 has, in addition to the plurality of slits 11a (11a1-11a4) formed at or near the bending regions, a plurality of additional slits 11b (11b1-11b4), each of which is shorter than the slit 11a. The relatively short slit 11b is hereinafter referred to as a "short slit."

An arrangement and function of the short slits 11b will be described with reference to FIG. 19.

Figure 19:
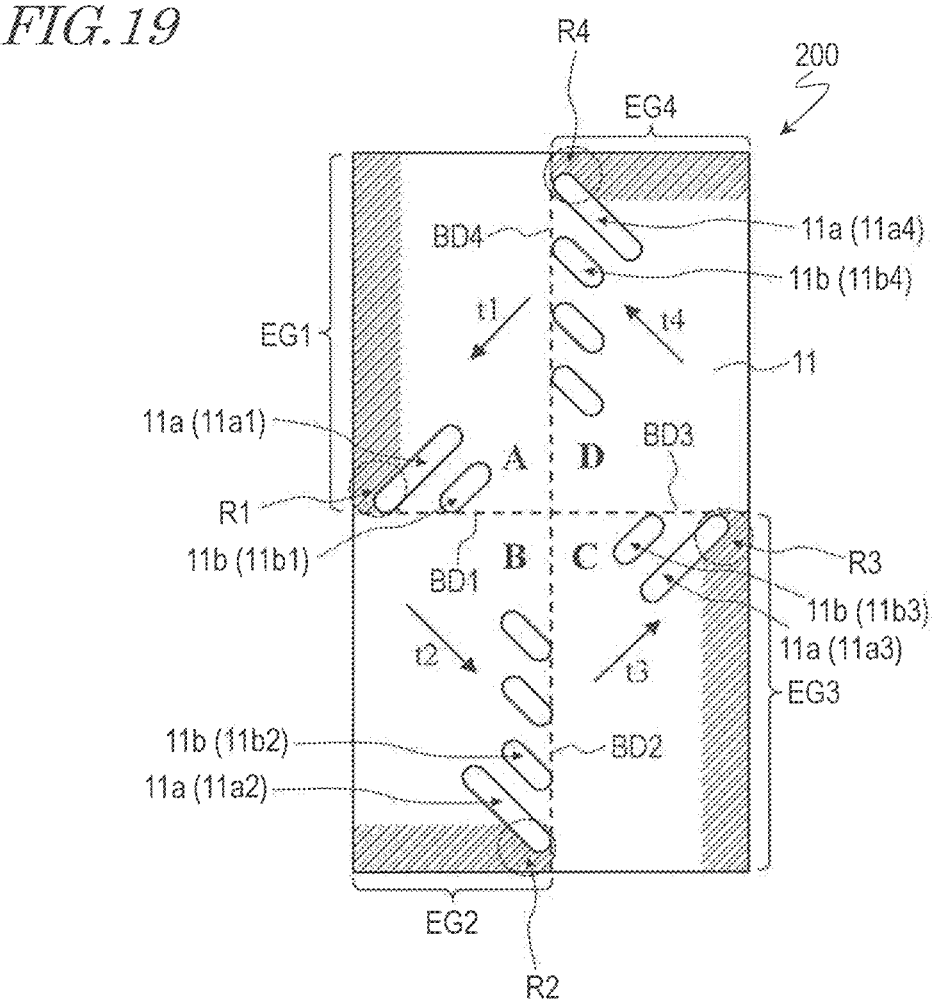
FIG. 19 is a plan view schematically showing the liquid crystal display apparatus 200.

As shown in FIG. 19, the pixel electrode 11 has at least one (here, one) slit 11b1 formed at or near the boundary BD1 between the liquid crystal domain A and the liquid crystal domain B. The slit 11b1 is located within a region corresponding to the liquid crystal domain A, extending substantially parallel to the reference alignment direction t1 of the liquid crystal domain A. By providing the slit 11b1 extending substantially parallel to the reference alignment direction t1 of the liquid crystal domain A, an increased number of liquid crystal molecules are oriented substantially parallel to the reference alignment direction t1 near the boundary BD1 (the probability that such an oriented liquid crystal molecule is present is increased). Therefore, the area of the dark line near the boundary BD1 decreases.

In addition, at least one (here, three) slit 11b2 is formed at or near the boundary BD2 between the liquid crystal domain B and the liquid crystal domain C. The slit 11b2 is located within a region corresponding to the liquid crystal domain B, extending substantially parallel to the reference alignment direction t2 of the liquid crystal domain B. By providing the slit 11b2 extending substantially parallel to the reference alignment direction t2 of the liquid crystal domain B, an increased number of liquid crystal molecules are oriented substantially parallel to the reference alignment direction t2 near the boundary BD2 (the probability that such an oriented liquid crystal molecule is present is increased). Therefore, the area of the dark line near the boundary BD2 decreases.

In addition, at least one (here, one) slit 11b3 is formed at or near the boundary BD3 between the liquid crystal domain C and the liquid crystal domain D. The slit 11b3 is located within a region corresponding to the liquid crystal domain C, extending substantially parallel to the reference alignment direction t3 of the liquid crystal domain C. By providing the slit 11b3 extending substantially parallel to the reference alignment direction t3 of the liquid crystal domain C, an increased number of liquid crystal molecules are oriented substantially parallel to the reference alignment direction t3 near the boundary BD3 (the probability that such an oriented liquid crystal molecule is present is increased). Therefore, the area of the dark line near the boundary BD3 decreases.

In addition, at least one (here, three) slit 11b4 is formed at or near the boundary BD4 between the liquid crystal domain D and the liquid crystal domain A. The slit 11b4 is located within a region corresponding to the liquid crystal domain D, extending substantially parallel to the reference alignment direction t4 of the liquid crystal domain D. By providing the slit 11b4 extending substantially parallel to the reference alignment direction t4 of the liquid crystal domain D, an increased number of liquid crystal molecules are oriented substantially parallel to the reference alignment direction t4 near the boundary BD4 (the probability that such an oriented liquid crystal molecule is present is increased). Therefore, the area of the dark line near the boundary BD4 decreases.

In the liquid crystal display apparatus 200 of this embodiment, the pixel electrode 11 has the slits 11a1-11a4 at or near the bending regions R1-R4 (regions near the edge portions EG1-EG4 and corresponding to the bent portions of the dark lines), and therefore, the areas of the bent portions of the dark lines can be reduced.

Furthermore, in the liquid crystal display apparatus 200 of this embodiment, the pixel electrode 11 has the short slits 11b1-11b4 provided at or near the boundaries (domain boundaries) BD1-BD4 between adjacent liquid crystal domains, and therefore, the areas of the dark lines near the domain boundaries BD1-BD4 can be reduced. Therefore, the transmittance can be further improved.

The result of a test on the transmittance improving effect that was carried out by an alignment simulation based on actually measured values, will now be described.

Figure 20:
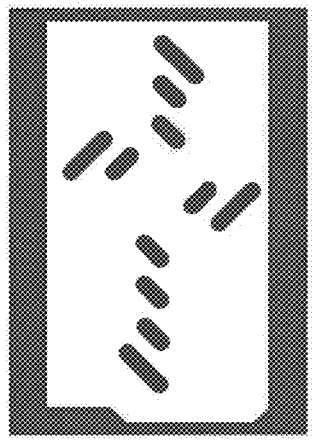
FIGS. 20(a), 20(b), and 20(c) are diagrams showing the results of an alignment simulation on Example 2.
Figure 20:
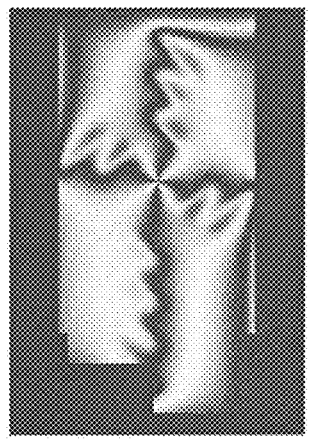
Figure 20:
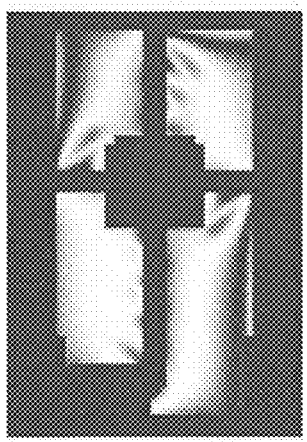

FIGS. 20(a), 20(b), and 20(c) show the result of a test in the case where slits 11a1-11a4 as well as short slits 11b1-11b4 are formed in the pixel electrode 11 as in this embodiment (Example 2). FIG. 20(a) shows an electrode pattern that was used in the test. The electrode pattern used in the test is different from the configuration illustrated in FIGS. 18 and 19 in that two short slits 11b4 are formed at or near the domain boundary BD4. FIGS. 20(b) and 20(c) show transmittance distributions in a pixel during white display. FIG. 20(b) shows the case where no interconnect or the like is present in the pixel, and FIG. 20(c) shows the case where an interconnect and the like are present in the pixel.

The comparison between FIGS. 7(b) and 20(b) and the comparison between FIGS. 7(c) and 20(c) demonstrate that the areas of the dark lines at the bent portions are smaller in Example 2 than in Comparative Example 1. In addition, the comparison between FIGS. 8(b) and 20(b) and the comparison between FIGS. 8(c) and 20(c) demonstrate that the areas of the dark lines at the bent portions are smaller in Example 2 than in Example 1. The ratio of the transmittance of Example 2 to the transmittance of Comparative Example 1 was 1.09 in the case where no interconnect or the like is present in the pixel, and 1.13 in the case where an interconnect and the like are present in the pixel. Thus, there is a 9-13% increase in transmittance.

According to the test results, it was verified that the transmittance can be further improved by forming the short slits 11ab-11b4 in the pixel electrode 11.

The effect of improving the transmittance by forming the short slits 11b (11b1-11b4) can be further enhanced by setting lengths L2 (see FIG. 18(b)) of the short slits 11b within a particular range. Specifically, in the case where the liquid crystal layer 30 has a thickness (cell gap) of 2.5 μm or more and 3.5 μm or less, then if the lengths L2 of the short slits 11b are 6 μm or more and 10 μm or less, the transmittance can be sufficiently improved.

Figure 21:
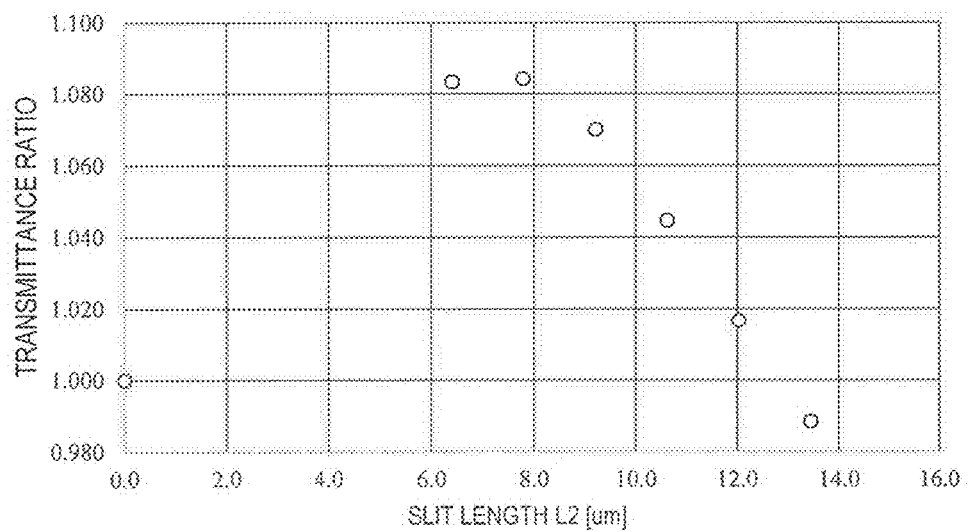
FIG. 21(a) is a graph showing a relationship between a length L2 of a short slit 11b and a transmittance ratio.
FIG. 21(b) is a graph showing a relationship between a position of the short slit 11b and the transmittance ratio.
Figure 21:
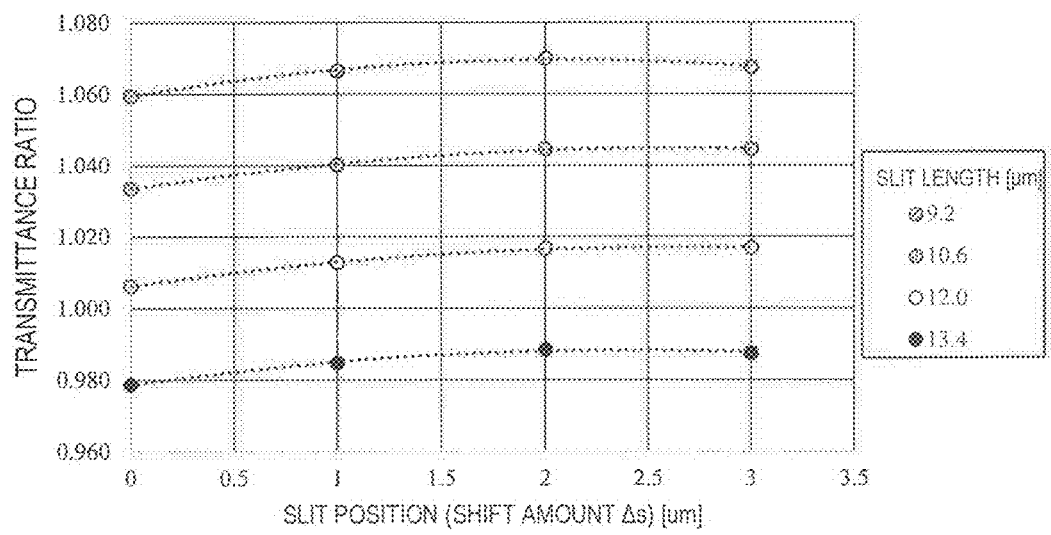

FIG. 21(a) shows a relationship between the lengths L2 of the short slits 11b and the transmittance ratio (where the transmittance of Comparative Example 1 is 1.00) in the case where the liquid crystal layer has a thickness of 3 μm. As shown in FIG. 21(a), the transmittance ratio is highest in the case where the lengths L2 of the short slits 11b are about 8 μm. As can also be seen from FIG. 21(a), the transmittance improving effect is higher in the case where the lengths L2 of the slits 11b are 6 μm or more and 10 μm or less.

FIG. 21(b) shows a relationship between the position of the short slit 11b (shift amount Δs) and the transmittance ratio. As can be seen from FIG. 21(b), the transmittance ratio varies depending on the position of the slit 11b. Specifically, the positive shift amount Δs (i.e., the slit 11b crosses a domain boundary) is preferable for improvement of the transmittance ratio.

The short slit 11b (11b1-11b4) has a width W2 (see FIG. 18(b)) of, for example, 3.5 μm, of course, without limitation. The width W2 of the slit 11b is typically 3 μm or more and 4 μm or less.

Note that the direction in which the short slit 11b extends does not necessarily need to be exactly parallel to the reference alignment direction of the corresponding liquid crystal domain. The slit 11b is only required to improve the transmittance to substantially the same extent as when the slit 11b extends parallel to the reference alignment direction. For example, the angle between the direction in which the slit 11b extends and the reference alignment direction of the corresponding liquid crystal domain may be 5° or less.

In addition, a space p1 (see FIG. 18(b)) between a slit 11a and a short slit 11b adjacent thereto is preferably not excessive for effective improvement of the transmittance. For example, the space p1 is preferably substantially the same as the width W1 of the slit 11a or the width W2 of the short slit 11b. Likewise, a space p2 (see FIG. 18(b)) between two adjacent short slits 11b is preferably not excessive. For example, the space p2 is preferably the same as the width W2 of the short slit 11b.

Note that the number of the short slits 11b formed at or near the domain boundaries BD1-BD4 is not limited to that illustrated herein (1 or 3). In addition, for not all of the domain boundaries BD1, BD2, BD3, and BD4, the short slit 11b does not necessarily need to be formed. The short slit 11b may be removed from a portion of the boundaries.

Third Embodiment

Figure 22:
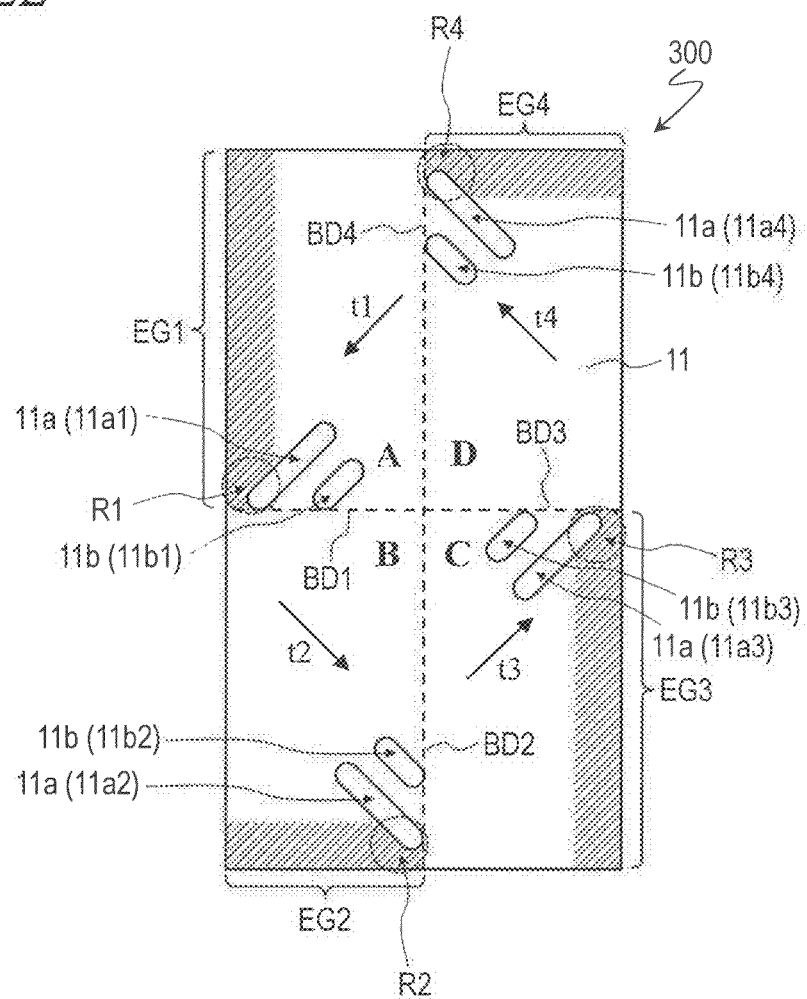
FIG. 22 is a plan view schematically showing a liquid crystal display apparatus 300 according to an embodiment of the present invention.

A liquid crystal display apparatus 300 according to this embodiment will be described with reference to FIG. 22. FIG. 22 is a plan view schematically showing the liquid crystal display apparatus 300.

As shown in FIG. 22, the liquid crystal display apparatus 300 is different from the liquid crystal display apparatus 200 of the second embodiment in that the pixel electrode 11 has only one short slit 11b at or near each of the domain boundaries BD1-BD4.

As described about the liquid crystal display apparatus 200 of the second embodiment, the short slit 11b has a high transmittance improving effect. However, if the width, position, or the like of the short slit 11b varies during manufacture, the transmittance is likely to be changed, leading to display irregularity (variations in luminance).

If only one short slit 11b is formed at or near each of the domain boundaries BD1-BD4 as in this embodiment, the transmittance can be improved while display irregularity is reduced.

Figure 23:
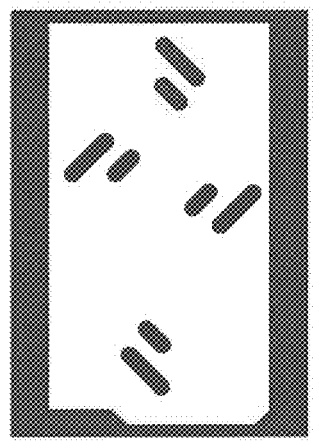
FIGS. 23(a), 23(b), and 23(c) are diagrams showing the results of an alignment simulation on Example 3.
Figure 23:
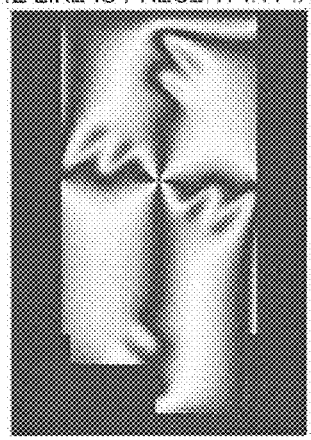
Figure 23:
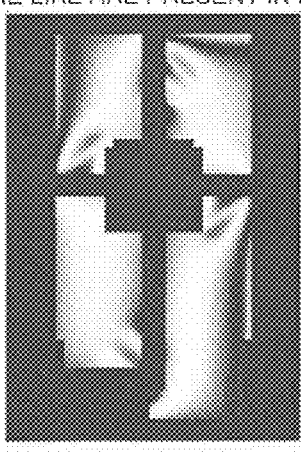

FIGS. 23(a), 23(b), and 23(c) show the results of a test on the transmittance improving effect, that was carried out by an alignment simulation, in the case where a single short slit 11b is formed at or near each of the domain boundaries BD1-BD4 as in this embodiment (Example 3). FIG. 23(a) shows an electrode pattern that was used in the test. FIGS. 23(b) and 23(c) show transmittance distributions in a pixel during white display. FIG. 23(b) shows the case where no interconnect or the like is present in the pixel, and FIG. 23(c) shows the case where an interconnect and the like are present in the pixel.

The comparison between FIG. 7(b) and FIG. 23(b) and the comparison between FIG. 7(c) and FIG. 23(c) demonstrate that the areas of the dark lines at the bent portions are smaller in Example 3 than in Comparative Example 1. In addition, the comparison between FIGS. 8(b) and 23(b) and the comparison between FIGS. 8(c) and 23(c) demonstrate that the areas of the dark lines at the bent portions are smaller in Example 3 than in Example 1. The ratio of the transmittance of Example 3 to the transmittance of Comparative Example 1 was 1.06 in the case where no interconnect or the like is present in the pixel, and 1.06 in the case where an interconnect and the like are present in the pixel. Thus, there is a 6-10% increase in transmittance.

Figure 24:
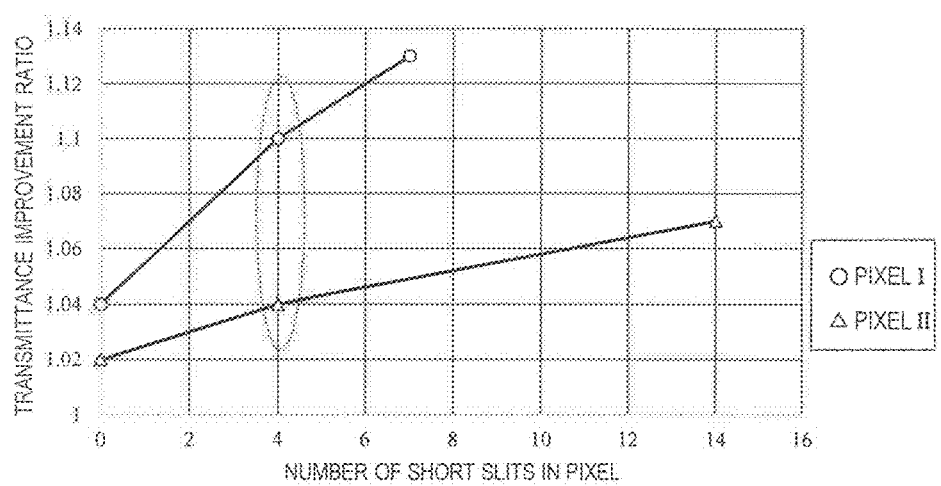
FIG. 24 is a graph showing a relationship between the number of short slits 11b in a pixel and the ratio of transmittance improvement.

In addition, the liquid crystal display apparatus 300 of this embodiment is robust against pressing with a finger for the following reason. FIG. 24 shows a relationship between the number of short slits 11b in a pixel and the ratio of transmittance improvement. FIG. 24 shows the ratio of transmittance improvement for two types of pixels (a "pixel I" and a "pixel II") having different length-to-width ratios. As shown in FIG. 24, as the number of short slits 11b increases, the transmittance improving effect becomes higher. However, as the number of short slits 11b increases, the probability that a trace of pressing with a finger occurs may increase. Conversely, as the number of short slits 11b decreases, the probability that a trace of pressing with a finger occurs decreases, and even if a trace of pressing with a finger occurs, the trace is less visible. Thus, there is a trade-off between the improvement of the transmittance by increasing the number of short slits 11b, and the reduction of occurrence of a trace of pressing with a finger. Therefore, by forming a single short slit 11b at or near each domain boundary (the number of short slits 11b is four in a pixel) as in this embodiment, the transmittance can be improved while the occurrence of a trace of pressing with a finger is reduced.

Fourth Embodiment

Figure 25:
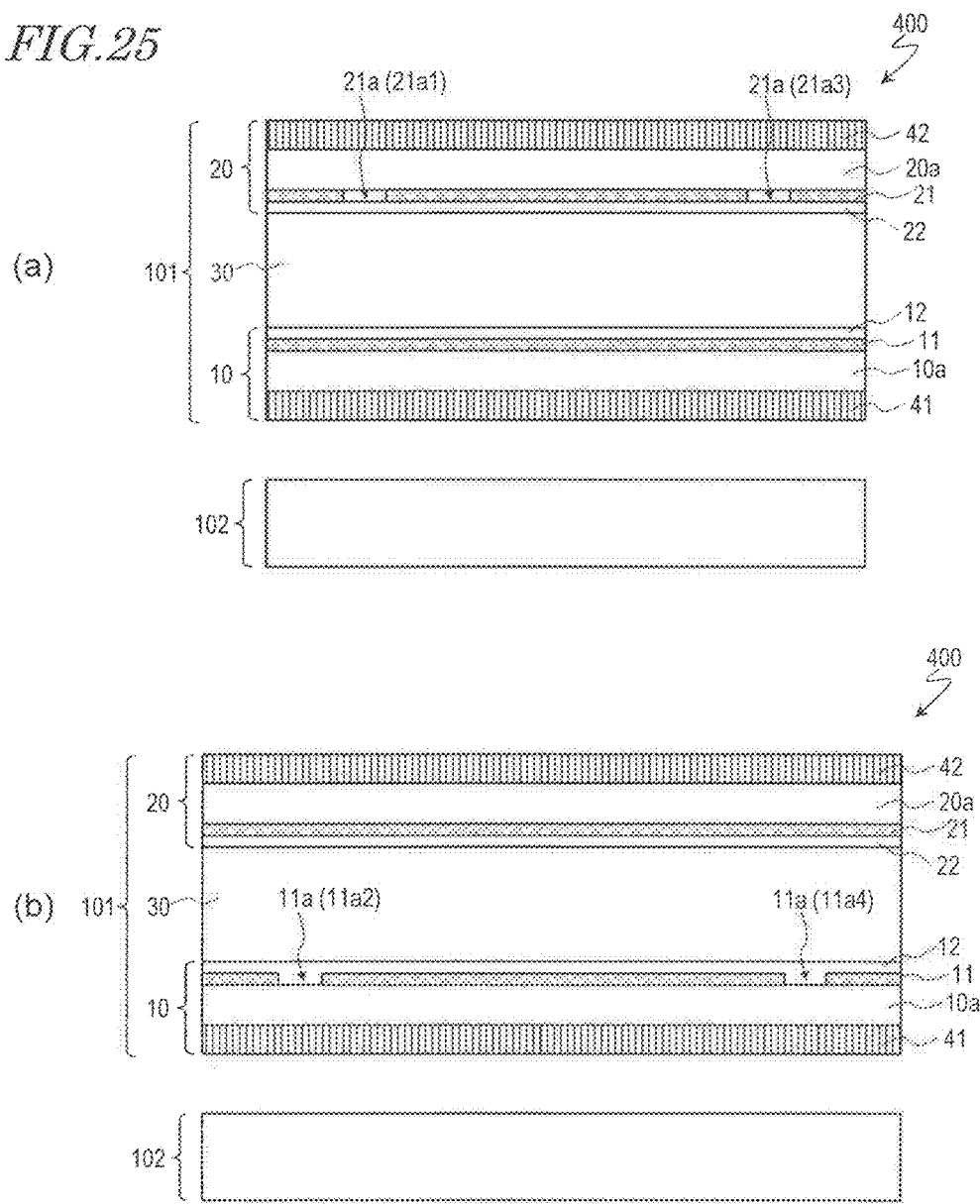
FIGS. 25(a) and 25(b) are cross-sectional views schematically showing a liquid crystal display apparatus 400 according to an embodiment of the present invention, and showing cross-sections taken along lines 25A-25A' and 25B-25B', respectively, of FIG. 26.
Figure 26:
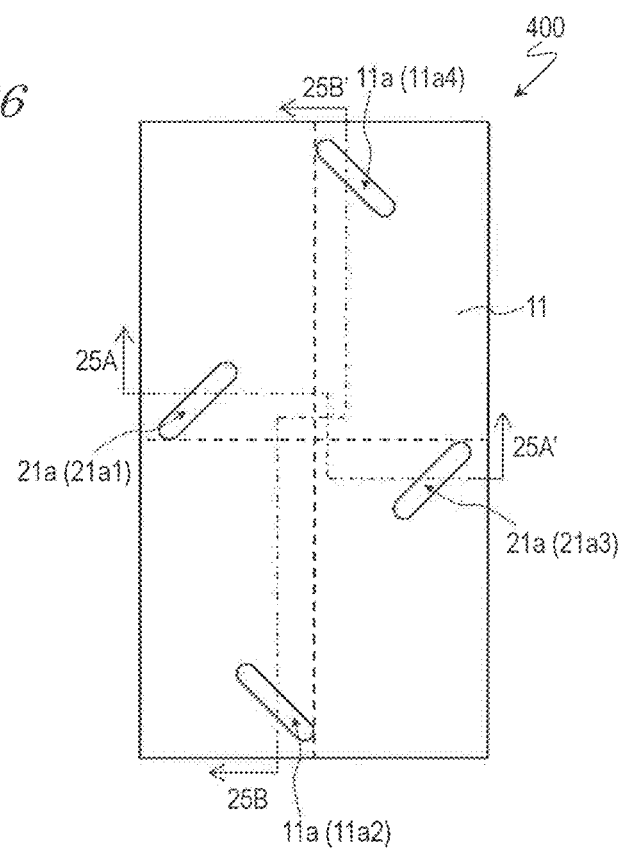
FIG. 26 is a plan view schematically showing the liquid crystal display apparatus 400.

A liquid crystal display apparatus 400 according to this embodiment will be described with reference to FIGS. 25 and 26. FIGS. 25(a) and 25(b) are cross-sectional views schematically showing the liquid crystal display apparatus 400. FIG. 26 is a plan view schematically showing the liquid crystal display apparatus 400. FIGS. 25(a) and 25(b) are cross-sectional views taken along lines 25A-25A' and 25B-25B', respectively, of FIG. 26.

The liquid crystal display apparatus 400 is different from the liquid crystal display apparatus 100 of the first embodiment in that a portion of the slits is formed in the counter electrode 21 (i.e., on the counter substrate 20). As shown in FIGS. 25 and 26, the pixel electrode 11 of the liquid crystal display apparatus 400 has a plurality of (here, two) slits 11a (11a2, 11a4). As shown in FIGS. 24 and 26, the counter electrode 21 of the liquid crystal display apparatus 400 has a plurality of (here, two) slits 21a (21a1, 21a3).

An arrangement of the slits 11a of the pixel electrode 11 and the slits 21a of the counter electrode 21 will now be described with reference to additionally FIG. 27.

Figure 27:
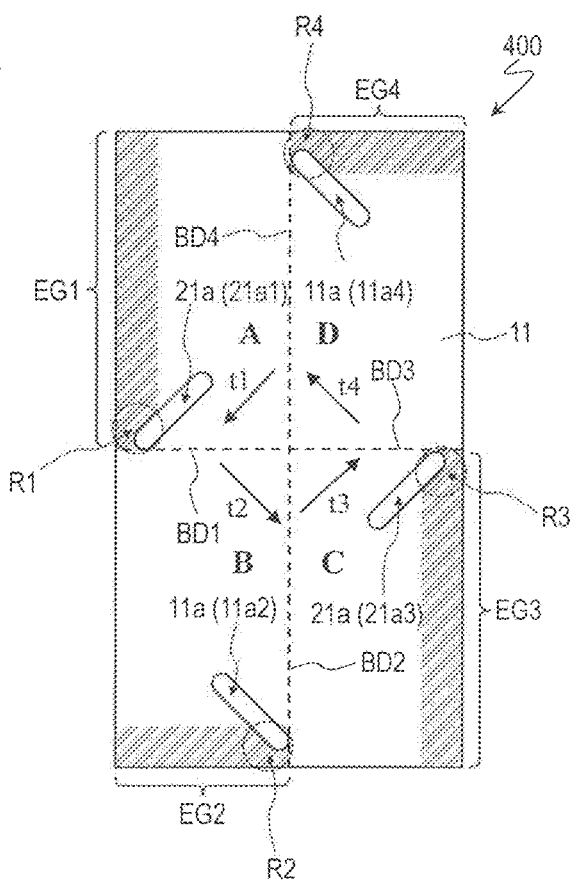
FIG. 27 is a plan view schematically showing the liquid crystal display apparatus 400.

As shown in FIG. 27, the counter electrode 21 has the slit 21a1 at or near the first bending region R1. The slit 21a1 extends substantially parallel to the reference alignment direction t1 of the liquid crystal domain A. The counter electrode 21 does not have a slit, except for the slit 21a1, in a region near the edge portion EG1. In other words, the single slit 21a1 is formed in a region where the dark line DL5 occurs.

By providing the slit 21a1 extending substantially parallel to the reference alignment direction t1 of the liquid crystal domain A, an increased number of liquid crystal molecules are oriented substantially parallel to the reference alignment direction t1 in and near the first bending region R1 (the probability that such an oriented liquid crystal molecule is present is increased). Therefore, the area of the dark line decreases at the bent portion (an intersection between the dark line DL1 and the dark line DL5).

The pixel electrode 11 has the slit 11a2 at or near the second bending region R2. The slit 11a2 extends substantially parallel to the reference alignment direction t2 of the liquid crystal domain B. The pixel electrode 11 does not have a slit, except for the slit 11a2, in a region near the edge portion EG2. In other words, the single slit 11a2 is formed in a region where the dark line DL6 occurs.

By providing the slit 11a2 extending substantially parallel to the reference alignment direction t2 of the liquid crystal domain B, an increased number of liquid crystal molecules are oriented substantially parallel to the reference alignment direction t2 in and near the second bending region R2 (the probability that such an oriented liquid crystal molecule is present is increased). Therefore, the area of the dark line decreases at the bent portion (an intersection between the dark line DL2 and the dark line DL6).

The counter electrode 21 has the slit 21a3 at or near the third bending region R3. The slit 21a3 extends substantially parallel to the reference alignment direction t3 of the liquid crystal domain C. The counter electrode 21 does not have a slit, except for the slit 21a3, in a region near the edge portion EG3. In other words, the single slit 21a3 is formed in a region where the dark line DL7 occurs.

By providing the slit 21a3 extending substantially parallel to the reference alignment direction t3 of the liquid crystal domain C, an increased number of liquid crystal molecules are oriented substantially parallel to the reference alignment direction t3 in and near the third bending region R3 (the probability that such an oriented liquid crystal molecule is present is increased). Therefore, the area of the dark line decreases at the bent portion (an intersection between the dark line DL3 and the dark line DL7).

The pixel electrode 11 has the slit 11a4 at or near the fourth bending region R4. The slit 11a4 extends substantially parallel to the reference alignment direction t4 of the liquid crystal domain D. The pixel electrode 11 does not have a slit, except for the slit 11a4, in a region near the edge portion EG4. In other words, the single slit 11a4 is formed in a region where the dark line DL8 occurs.

By providing the slit 11a4 extending substantially parallel to the reference alignment direction t4 of the liquid crystal domain D, an increased number of liquid crystal molecules are oriented substantially parallel to the reference alignment direction t4 in and near the fourth bending region R4 (the probability that such an oriented liquid crystal molecule is present is increased). Therefore, the area of the dark line decreases at the bent portion (an intersection between the dark line DL4 and the dark line DL8).

As described above, in the liquid crystal display apparatus 400 of this embodiment, the pixel electrode 11 and the counter electrode 21 have the slits 21a1, 11a2, 21a3, and 11a4 at or near the bending regions R1-R4, and therefore, the areas of the dark lines at the bent portions can be reduced. Therefore, the transmittance can be improved.

Figure 28:
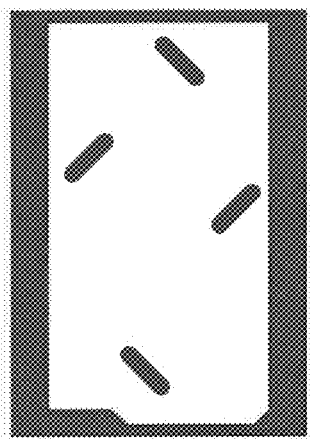
FIGS. 28(a), 28(b), and 28(c) are diagrams showing the results of an alignment simulation on Example 4.
Figure 28:
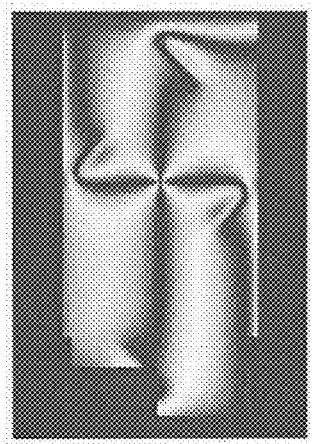
Figure 28:
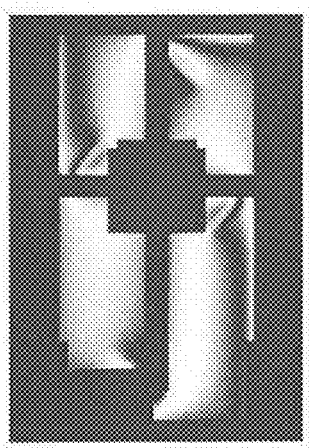

FIGS. 28(a), 28(b), and 28(c) show the results of a test on the transmittance improving effect, that was carried out by an alignment simulation, in the case where slits 11a and 21a are formed in the pixel electrode 11 and the counter electrode 21 as in this embodiment (Example 4). FIG. 28(a) shows an electrode pattern (the combination of the pattern of the pixel electrode 11 and the pattern of the counter electrode 21) used in the test. FIGS. 28(b) and 28(c) show transmittance distributions in a pixel during white display. FIG. 28(b) shows the case where no interconnect or the like is present in the pixel, and FIG. 28(c) shows the case where an interconnect and the like are present in the pixel.

The comparison between FIG. 7(b) and FIG. 28(b) and the comparison between FIG. 7(c) and FIG. 28(c) demonstrate that the areas of the dark lines at the bent portions are smaller in Example 4 than in Comparative Example 1. The ratio of the transmittance of Example 4 to the transmittance of Comparative Example 1 was 1.02 in the case where no interconnect or the like is present in the pixel, and 1.02 in the case where an interconnect and the like are present in the pixel. Thus, there is a 2% increase in transmittance.

According to the above test results, it was verified that the transmittance can be improved by forming the slits 11a2 and 11a4 in the pixel electrode 11 and the slits 21a1 and 21a3 in the counter electrode 21.

In addition, the pixel electrode 11 and the counter electrode 21 of the liquid crystal display apparatus 400 of this embodiment does not have a slit, except for the slits 21a1, 11a2, 21a3, and 11a4, in regions near the edge portions EG1-EG4. Therefore, a decrease in display quality can be reduced for the same reason that has been described for the liquid crystal display apparatus 100 of the first embodiment.

Furthermore, the liquid crystal display apparatus 400 of this embodiment, in which a portion of the slits are formed in the counter substrate 20, has the following advantage. In the alignment division structure illustrated in FIG. 4, the boundary between the first pretilt region 12a and the second pretilt region 12b of the first photo alignment film 12 corresponds to the boundary BD2 between the liquid crystal domain B and the liquid crystal domain C, and the boundary BD4 between the liquid crystal domain D and the liquid crystal domain A. Thus, the domain boundaries BD2 and BD4 are defined by the first photo alignment film 12 provided on the active matrix substrate 10. The boundary between the third pretilt region 22a and the fourth pretilt region 22b of the second photo alignment film 22 corresponds to the boundary BD1 between the liquid crystal domain A and the liquid crystal domain B, and the boundary BD3 between the liquid crystal domain C and the liquid crystal domain D. Thus, the domain boundaries BD1 and BD3 are defined by the second photo alignment film 22 provided on the counter substrate 20.

In this embodiment, the slits 21a1 and 21a3 located at or near the domain boundaries BD1 and BD3 are formed in the counter electrode 21 (i.e., on the counter substrate 20), and the slits 11a2 and 11a4 located at or near the domain boundaries BD2 and BD4 are formed in the pixel electrode 11 (i.e., on the active matrix substrate 10). Therefore, even if the active matrix substrate 10 and the counter substrate 20, when attached together, are misaligned (misaligned attachment), the slits are correctly positioned relative to the domain boundaries.

Note that the configuration in which all slits are formed in the pixel electrode 11 as in the first to third embodiments has the advantage that even if the misaligned attachment occurs, the slits are correctly positioned relative to the edges of the pixel electrode 11.

Fifth Embodiment

A liquid crystal display apparatus 500 according to this embodiment will be described with reference to FIG. 29.

Figure 29:
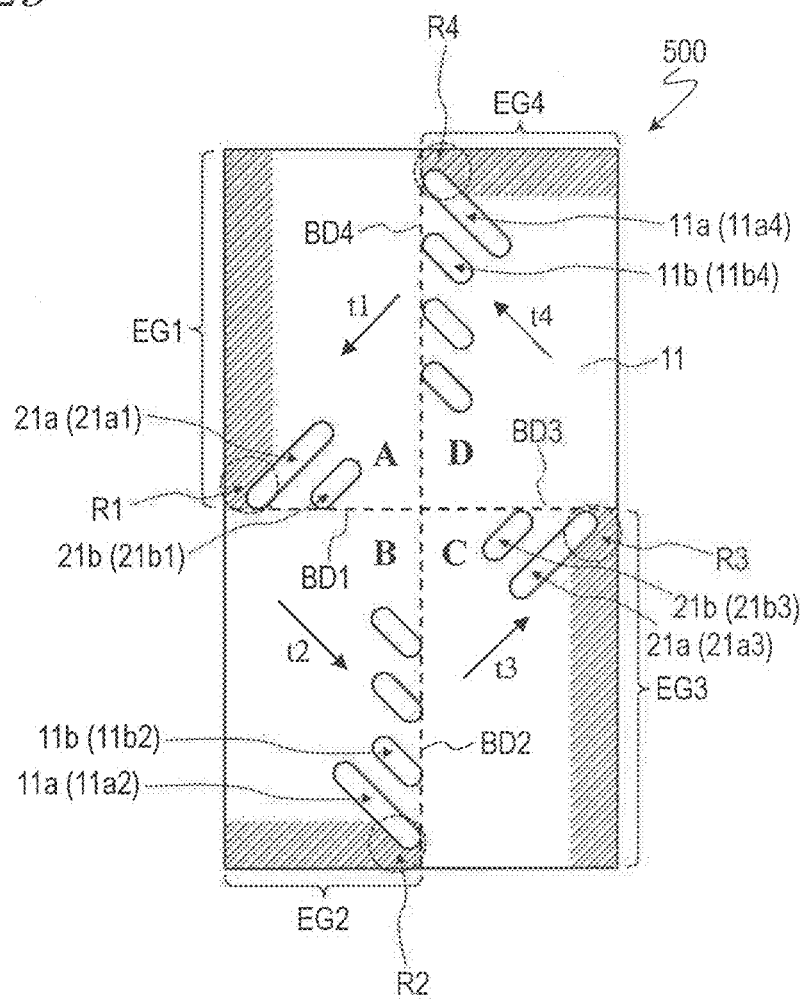
FIG. 29 is a plan view schematically showing a liquid crystal display apparatus 500 according to an embodiment of the present invention.

FIG. 29 is a plan view schematically showing the liquid crystal display apparatus 500.

As shown in FIG. 29, the liquid crystal display apparatus 500 of this embodiment is different from the liquid crystal display apparatus 400 of the fourth embodiment in that the pixel electrode 11 and the counter electrode 21 have, in addition to the plurality of slits 11a and 21a formed at or near the bending regions R1-R4, short slits 11b and 21b are formed at or near the domain boundaries BD1-BD4.

The counter electrode 21 has at least one (here, one) short slit 21b1 formed at or near the boundary BD1 between the liquid crystal domain A and the liquid crystal domain B. The short slit 21b1 is shorter than the slit 21a1. The short slit 21b1 is located in the region corresponding to the liquid crystal domain A, extending substantially parallel to the reference alignment direction t1 of the liquid crystal domain A. By providing the short slit 21b1 extending substantially parallel to the reference alignment direction t1 of the liquid crystal domain A, an increased number of liquid crystal molecules are oriented substantially parallel to the reference alignment direction t1 near the boundary BD1 (the probability that such an oriented liquid crystal molecule is present is increased). Therefore, the area of the dark line near the boundary BD1 decreases.

The pixel electrode 11 has at least one (here, three) short slit 11b2 formed at or near the boundary BD2 between the liquid crystal domain B and the liquid crystal domain C. The short slit 11b2 is shorter than the slit 11a2. The short slit 11b2 is located in the region corresponding to the liquid crystal domain B, extending substantially parallel to the reference alignment direction t2 of the liquid crystal domain B. By providing the short slit 11b2 extending substantially parallel to the reference alignment direction t2 of the liquid crystal domain B, an increased number of liquid crystal molecules are oriented substantially parallel to the reference alignment direction t2 near the boundary BD2 (the probability that such an oriented liquid crystal molecule is present is increased). Therefore, the area of the dark line near the boundary BD2 decreases.

The counter electrode 21 also has at least one (here, one) short slit 21b3 formed at or near the boundary BD3 between the liquid crystal domain C and the liquid crystal domain D. The short slit 21b3 is shorter than the slit 21a3. The short slit 21b3 is located in the region corresponding to the liquid crystal domain C, extending substantially parallel to the reference alignment direction t3 of the liquid crystal domain C. By providing the short slit 21b3 extending substantially parallel to the reference alignment direction t3 of the liquid crystal domain C, an increased number of liquid crystal molecules are oriented substantially parallel to the reference alignment direction t3 near the boundary BD3 (the probability that such an oriented liquid crystal molecule is present is increased). Therefore, the area of the dark line near the boundary BD3 decreases.

The pixel electrode 11 also has at least one (here, three) short slit 11b4 formed at or near the boundary BD4 between the liquid crystal domain D and the liquid crystal domain A. The short slit 11b4 is shorter than the slit 11a4. The short slit 11b4 is located in the region corresponding to the liquid crystal domain D, extending substantially parallel to the reference alignment direction t4 of the liquid crystal domain D. By providing the short slit 11b4 extending substantially parallel to the reference alignment direction t4 of the liquid crystal domain D, an increased number of liquid crystal molecules are oriented substantially parallel to the reference alignment direction t4 near the boundary BD4 (the probability that such an oriented liquid crystal molecule is present is increased). Therefore, the area of the dark line near the boundary BD4 decreases.

In the liquid crystal display apparatus 500 of this embodiment, the pixel electrode 11 and the counter electrode 21 have the short slits 21b1, 11b2, 21b3, and 11b4 provided at or near the domain boundaries BD1-BD4, and therefore, the areas of the dark lines near the domain boundaries BD1-BD4 can be reduced. Therefore, the transmittance can be further improved.

Figure 30:
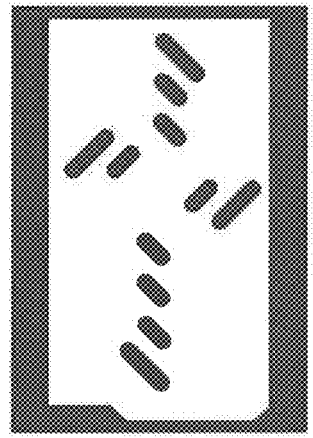
FIGS. 30(a), 30(b), and 30(c) are diagrams showing the results of an alignment simulation on Example 5.
Figure 30:
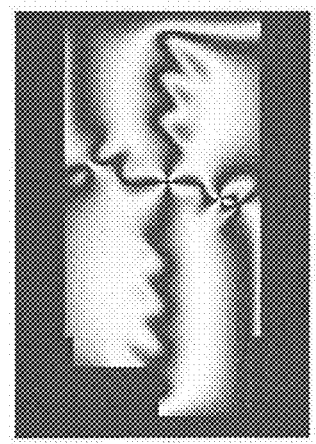
Figure 30:
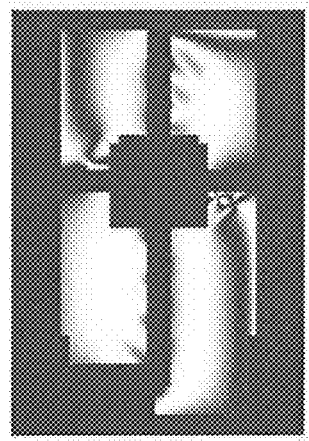

FIGS. 30(a), 30(b), and 30(c) show the results of a test on the transmittance improving effect, that was carried out by an alignment simulation, in the case where slits 21a1, 11a2, 21a3, and 11a4 as well as short slits 21b1, 11b2, 21b3, and 11b4 are formed in the pixel electrode 11 and the counter electrode 21 as in this embodiment (Example 5). FIG. 30(a) shows an electrode pattern (the combination of the pattern of the pixel electrode 11 and the pattern of the counter electrode 21) used in the test. The electrode pattern used in the test is different from the configuration illustrated in FIG. 29 in that two short slits 11b4 are formed at or near the domain boundary BD4. FIGS. 30(b) and 30(c) show transmittance distributions in a pixel during white display. FIG. 30(b) shows the case where no interconnect or the like is present in the pixel, and FIG. 30(c) shows the case where an interconnect and the like are present in the pixel.

The comparison between FIG. 7(b) and FIG. 30(b) and the comparison between FIG. 7(c) and FIG. 30(c) demonstrate that the areas of the dark lines at the bent portions are smaller in Example 5 than in Comparative Example 1. In addition, the comparison between FIGS. 28(b) and 30(b) and the comparison between FIGS. 28(c) and 30(c) demonstrate that the areas of the dark lines near the domain boundaries are smaller in Example 5 than in Example 4. The ratio of the transmittance of Example 5 to the transmittance of Comparative Example 1 was 1.05 in the case where no interconnect or the like is present in the pixel, and 1.06 in the case where an interconnect and the like are present in the pixel. Thus, there is a 5-6% increase in transmittance.

According to the test results, it was verified that the transmittance can be further improved by forming the short slits 21b1, 11b2, 21b3, and 11b4 in the pixel electrode 11 and the counter electrode 21. Note that it was observed that the short slits 21b1 and 21b3 formed on the counter electrode 21 tended to cause alignment disturbance slightly more significantly than the short slits 11b2 and 11b4 formed on the pixel electrode 11.

Sixth Embodiment

Figure 31:
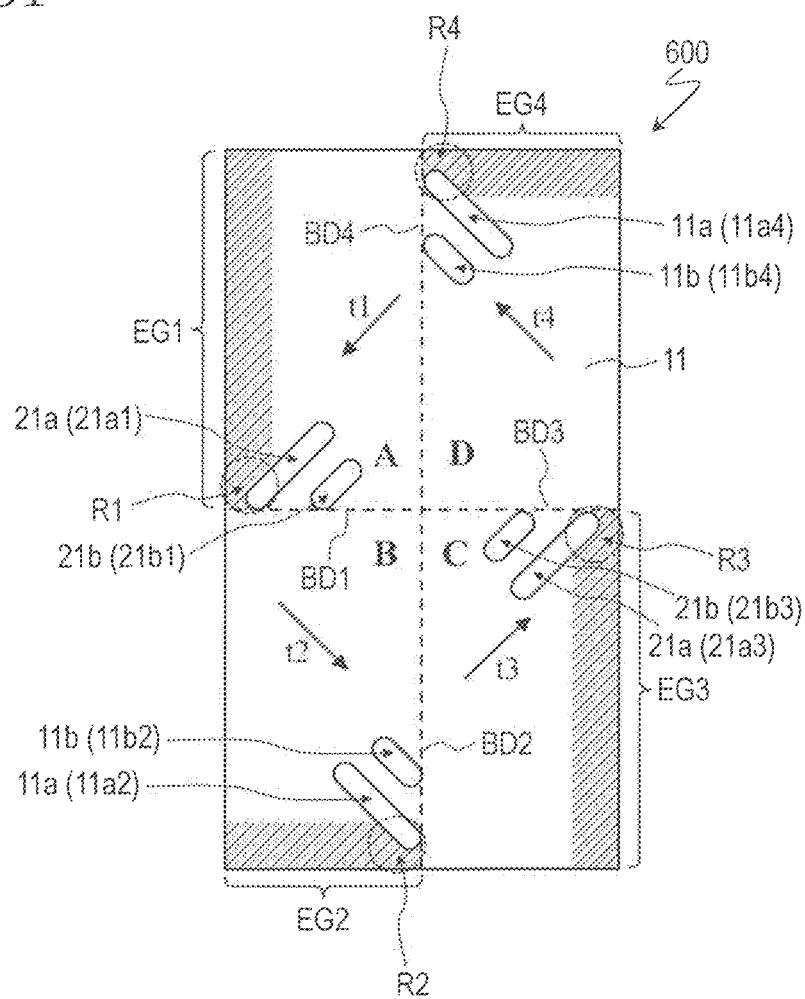
FIG. 31 is a plan view schematically showing a liquid crystal display apparatus 600 according to an embodiment of the present invention.

A liquid crystal display apparatus 600 according to this embodiment will be described with reference to FIG. 31. FIG. 31 is a plan view schematically showing the liquid crystal display apparatus 600.

As shown in FIG. 31, the liquid crystal display apparatus 600 is different from the liquid crystal display apparatus 500 of the fifth embodiment in that the pixel electrode 11 has only one short slit 11b at or near each of the domain boundaries BD2 and BD4. Therefore, in this embodiment, only one short slit 11b or 21b is formed near each of the domain boundaries BD1-BD4. Therefore, the transmittance can be improved while display irregularity is reduced.

Figure 32:
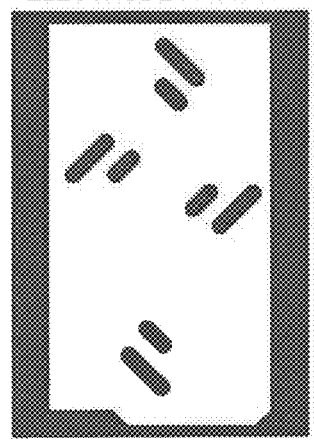
FIGS. 32(a), 32(b), and 32(c) are diagrams showing the results of an alignment simulation on Example 6.
Figure 32:
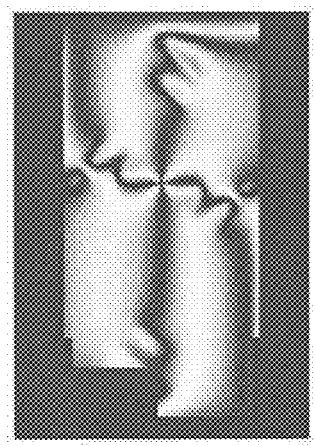
Figure 32:
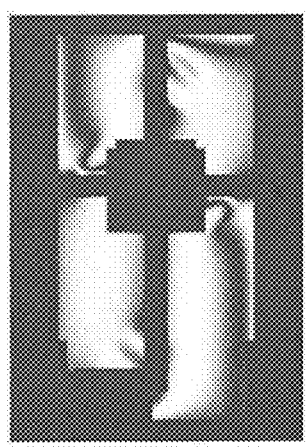

FIGS. 32(a), 32(b), and 32(c) show the results of a test on the transmittance improving effect, that was carried out by an alignment simulation, in the case where a single short slit 11b or 21b is formed near each of the domain boundaries BD1-BD4. FIG. 32(a) shows an electrode pattern (the combination of the pattern of the pixel electrode 11 and the pattern of the counter electrode 21) used in the test. FIGS. 32(b) and 32(c) show transmittance distributions in a pixel during white display. FIG. 32(b) shows the case where no interconnect or the like is present in the pixel, and FIG. 32(c) shows the case where an interconnect and the like are present in the pixel.

The comparison between FIG. 7(b) and FIG. 32(b) and the comparison between FIG. 7(c) and FIG. 32(c) demonstrate that the areas of the dark lines at the bent portions are smaller in Example 6 than in Comparative Example 1. In addition, the comparison between FIGS. 28(b) and 32(b) and the comparison between FIGS. 28(c) and 32(c) demonstrate that the areas of the dark lines near the domain boundaries are smaller in Example 6 than in Example 4. The ratio of the transmittance of Example 6 to the transmittance of Comparative Example 1 was 1.02 in the case where no interconnect or the like is present in the pixel, and 1.03 in the case where an interconnect and the like are present in the pixel. Thus, there is a 2-3% increase in transmittance.

Thus, as described in the fourth to sixth embodiments, the transmittance improving effect is also obtained in the case where a portion of the slits (and the short slits) are formed on the counter electrode 21. Note that in the examples in which the test was carried out, the transmittance improving effect was slightly higher in the cases where all slits (and short slits) are formed in the pixel electrode 11 (Examples 1, 2, and 3) than in the cases where a portion of the slits (and the short slits) are formed in the counter electrode 21 (Examples 4, 5, and 6). This may be because in the case where a portion of the slits are formed in the counter electrode 21, the angle between the tilt direction defined by the outer end portion of the slit 21a of the counter electrode 21 and the tilt direction defined by the edge of the pixel electrode 11 does not exceed 90° near the edge of the pixel electrode 11, and therefore, liquid crystal molecules are aligned in the tilt direction defined by the edge of the pixel electrode 11 near the outer end portion of the slit 21a, so that the dark line is slightly expanded. In contrast to this, the angle between the tilt direction defined by the outer end portion of the slit 11a formed in the pixel electrode 11 and the tilt direction defined by the edge of the pixel electrode 11 exceeds 90°, and therefore, liquid crystal molecules are aligned in the reference alignment direction (the angle between the reference alignment direction and the tilt direction defined by the edge of the pixel electrode 11 exceeds 90°) near the outer end portion of the slit 11a. Therefore, all slits (and short slits) are preferably formed in the pixel electrode 11 for improvement of the transmittance.

Although in the fourth to sixth embodiments, the configuration in which a portion of the slits (and the short slits) are formed in the counter electrode 21 has been described, all of the slits (and the short slits) may be formed in the counter electrode 21.

OTHER EMBODIMENTS

The method of alignment-dividing the pixel P into the four liquid crystal domains A-D (the arrangement of the liquid crystal domains A-D in the pixel P) is not limited to the examples of FIG. 4, etc.

Figure 33:
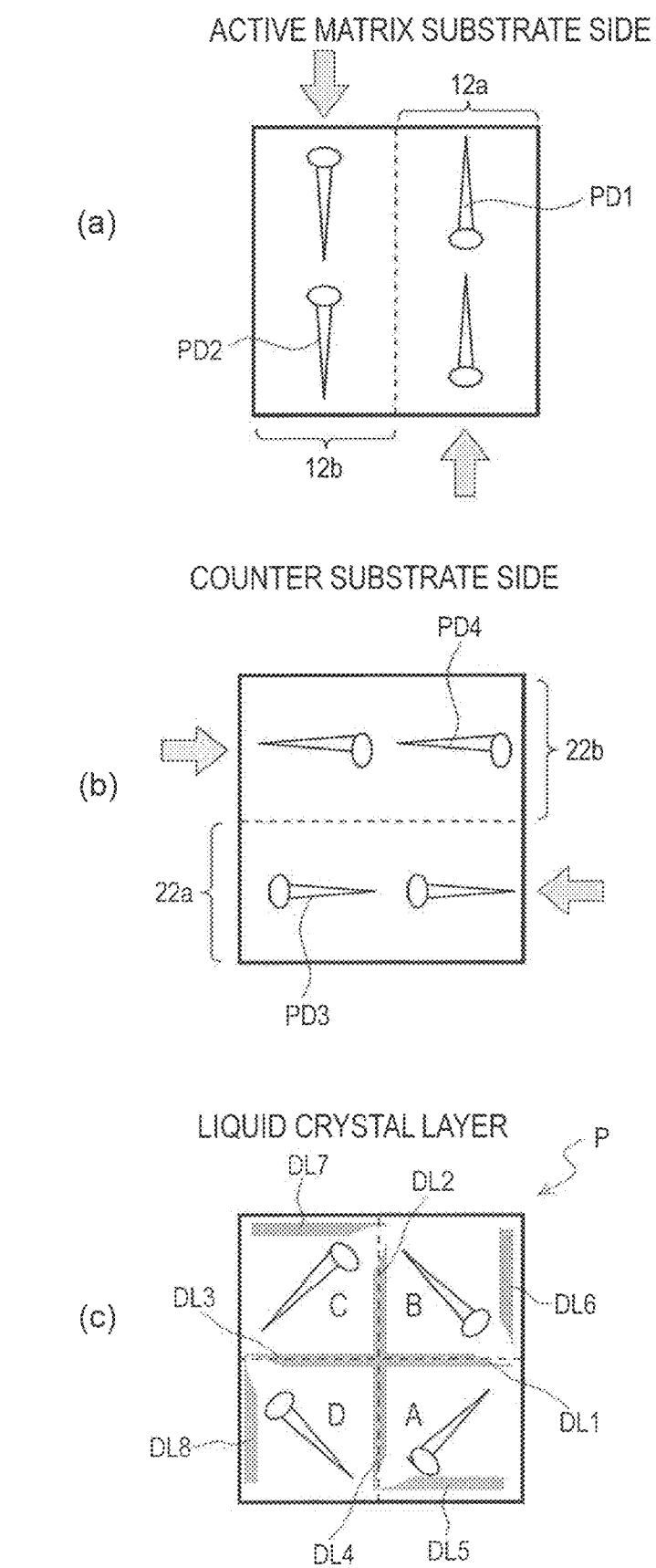
FIGS. 33(a), 33(b), and 33(c) are diagrams for describing a method for obtaining another example alignment division structure.

For example, an alignment division pixel P as shown in FIG. 33(c) can be formed by attaching together an active matrix substrate 10 and a counter substrate 20 that have been subjected to an alignment treatment as shown in FIGS. 33(a) and 33(b). The pixel P of FIG. 33(c) has four liquid crystal domains A-D as with the pixel P of FIG. 4.

While the liquid crystal domains A-D in the pixel P of FIG. 4 are located at the upper left, lower left, lower right, and upper right quadrants in this order (i.e., counterclockwise from the upper left quadrant). In the pixel P of FIG. 33(c), the liquid crystal domains A-D are located at the lower right, upper right, upper left, and lower left quadrants in this order (i.e., counterclockwise from the lower right quadrant). This is because the left and right regions of the active matrix substrate 10 and the upper and lower regions of the counter substrate 20 each have opposite pretilt directions between the pixel P of FIG. 4 and the pixel P of FIG. 33(c). In the pixel P of FIG. 33(c), the dark lines DL1-DL8 together form a left-facing swastika shape.

Although the examples in which four liquid crystal domains are formed in a pixel have been described in the first to sixth embodiments, the number of liquid crystal domains formed in a pixel is not limited to four. For example, two liquid crystal domains may be formed in a pixel, or eight liquid crystal domains may be formed in a pixel.

Figure 34:
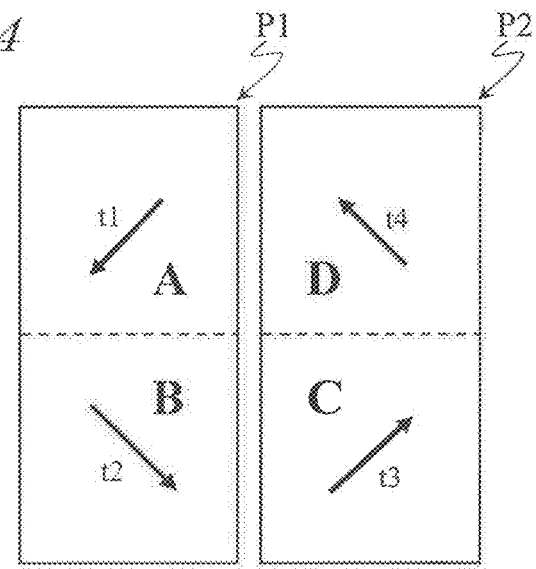
FIG. 34 is a diagram showing an example in which two liquid crystal domains are formed in a pixel, and showing two pixels P1 and P2 adjacent to each other in the row direction.

FIG. 34 shows an example in which two liquid crystal domains are formed in a pixel. FIG. 34 shows two pixels P1 and P2 adjacent to each other in the row direction.

As shown in FIG. 34, liquid crystal domains A and B are formed in the pixel P1, and liquid crystal domains C and D are formed in the pixel P2. In the example of FIG. 34, although only two (two kinds of) liquid crystal domains are formed in a pixel, two adjacent pixel units in the row direction have four (four kinds of) liquid crystal domains. In the case where the pixel size is so small that it is difficult to form the four division alignments (four domains) in a pixel, viewing angle compensation may be carried out using the configuration of FIG. 34.

Figure 35:
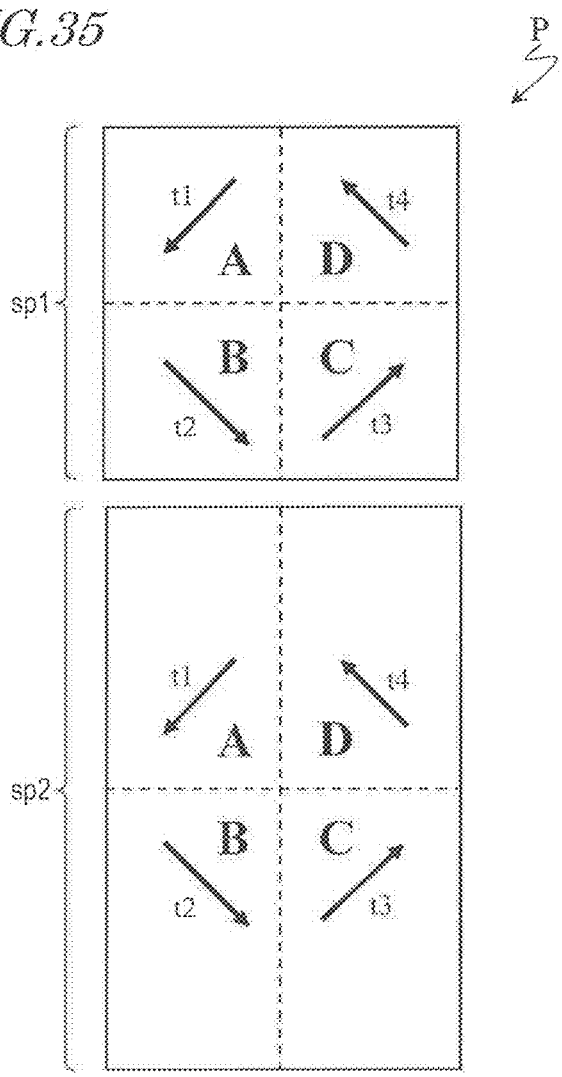
FIG. 35 is a diagram showing an example configuration in which eight liquid crystal domains are formed in a pixel.

FIG. 35 shows an example configuration in which eight liquid crystal domains are formed in a pixel. FIG. 35 shows a single pixel P.

In the example of FIG. 35, the pixel P includes a plurality of (here, two) sub-pixels sp1 and sp2. In each of the sub-pixels sp1 and sp2, four liquid crystal domains A, B, C, and D are formed.

The configuration of FIG. 35 can be used in, for example, a multi-pixel drive mode liquid crystal display apparatus. In the multi-pixel drive mode, a pixel electrode is divided into a plurality of (e.g., two) sub-pixel electrodes. The sub-pixels sp1 and sp2 each correspond to a single sub-pixel electrode. By applying different display voltages to the different sub-pixel electrodes, the viewing angle dependency of y characteristics can be reduced. Specifically, various known configurations can be used to apply display voltages to a plurality of different sub-pixel electrodes.

INDUSTRIAL APPLICABILITY

A liquid crystal display apparatus according to an embodiment of the present invention is suitably used in applications such as television sets in which high-quality display is required.

REFERENCE SIGNS LIST

1 TFT
2 scan line
3 signal line
4 storage capacitor line
5 gate electrode
6 source electrode
7 drain electrode
7' connecting portion
8 storage capacitor electrode
9 storage capacitor counter electrode
10 active matrix substrate
10a substrate
11 pixel electrode
11a, 11a1, 11a2, 11a3, 11a4 slit
11b, 11b1, 11b2, 11b3, 11b4 short slit
12 first photo alignment film
12a first pretilt region
12b second pretilt region
20 counter substrate
20a substrate
21 counter electrode
21a, 21a1, 21a3 slit
21b, 21b1, 21b3 short slit
22 second photo alignment film
22a third pretilt region
22b fourth pretilt region
30 liquid crystal layer
41, 42 polarizing plate
100, 200, 300, 400, 500, 600 liquid crystal display apparatus
101 liquid crystal display panel
102 backlight
A, B, C, D liquid crystal domain
t1, t2, t3, t4 reference alignment direction
P, P1, P2 pixel
PA1, PA2 polarization axis
PD1 first pretilt direction
PD2 second pretilt direction
PD3 third pretilt direction
PD4 fourth pretilt direction
BD1, BD2, BD3, BD4 boundary between liquid crystal domains
DL1, DL2, DL3, DL4, DL5, DL6, DL7, DL8 dark line
EG1, EG2, EG3, EG4 edge portion
R1, R2, R3, R4 bending region

The invention claimed is:

1. A liquid crystal display apparatus comprising:
a first and a second substrate facing each other;
a liquid crystal layer of a vertical alignment type provided between the first and second substrates; and
a plurality of pixels arranged in a matrix,
wherein the first substrate has a pixel electrode provided for each of the plurality of pixels, and a first photo alignment film provided between the pixel electrode and the liquid crystal layer,
the second substrate has a counter electrode facing the pixel electrode, and a second photo alignment film provided between the counter electrode and the liquid crystal layer,
each of the plurality of pixels has a plurality of liquid crystal domains having different reference alignment directions defined by the first and second photo alignment films,
the plurality of liquid crystal domains include a first liquid crystal domain, the reference alignment direction of the first liquid crystal domain being a first direction,
a portion of a plurality of edges of the pixel electrode that is close to the first liquid crystal domain includes a first edge portion, the angle between an azimuth angle direction perpendicular to the first edge portion and pointing toward the inside of the pixel electrode, and the first direction, being greater than 90°,
a portion of a region near the first edge portion of each of the plurality of pixels where the first edge portion intersects with a first boundary between the first liquid crystal domain and another liquid crystal domain is referred to as a first bending region, and the pixel electrode or the counter electrode has a first slit formed at or near the first bending region and extending substantially parallel to the first direction, and does not have a slit, except for the first slit, in a region near the first edge portion.

2. The liquid crystal display apparatus of claim 1, wherein the pixel electrode has the first slit.

3. The liquid crystal display apparatus of claim 1, wherein the counter electrode has the first slit.

4. The liquid crystal display apparatus of claim 1, wherein the liquid crystal layer has a thickness of 2.5 μm or more and 3.5 μm or less, and the first slit has a length of 11 μm or more and 17 μm or less.

5. The liquid crystal display apparatus of claim 1, wherein the pixel electrode or the counter electrode has at least one second slit formed at or near the first boundary and extending substantially parallel to the first direction, the at least one second slit being shorter than the first slit.

6. The liquid crystal display apparatus of claim 5, wherein the at least one second slit formed at or near the first boundary is a single second slit.

7. The liquid crystal display apparatus of claim 5, wherein the liquid crystal layer has a thickness of 2.5 μm or more and 3.5 μm or less, and the second slit has a length of 6 μm or more and 10 μm or less.

8. The liquid crystal display apparatus of claim 1, wherein the plurality of liquid crystal domains include a second liquid crystal domain, the reference alignment direction of which is a second direction different from the first direction, a third liquid crystal domain, the reference alignment direction of which is a third direction different from the first and second directions, and a fourth liquid crystal domain, the reference alignment direction of which is a fourth direction different from the first, second, and third directions, and the first, second, third, and fourth directions are four directions, the angle between any two of which is substantially equal to an integer multiple of 90°.

9. The liquid crystal display apparatus of claim 8, wherein a portion of the plurality of edges of the pixel electrode that is located close to the second liquid crystal domain includes a second edge portion, the angle between an azimuth angle direction perpendicular to the second edge portion and pointing toward the inside of the pixel electrode, and the second direction, being greater than 90°, a portion of a region near the second edge portion of each of the plurality of pixels where the second edge portion intersects with a second boundary between the second liquid crystal domain and another liquid crystal domain is referred to as a second bending region, the pixel electrode or the counter electrode has a third slit formed at or near the second bending region and extending substantially parallel to the second direction, and does not have a slit, except for the third slit, in a region near the second edge portion, a portion of the plurality of edges of the pixel electrode that is located close to the third liquid crystal domain includes a third edge portion, the angle between an azimuth angle direction perpendicular to the third edge portion and pointing toward the inside of the pixel electrode, and the third direction, being greater than 90°, a portion of a region near the third edge portion of each of the plurality of pixels where the third edge portion intersects with a third boundary between the third liquid crystal domain and another liquid crystal domain is referred to as a third bending region, the pixel electrode or the counter electrode has a fourth slit formed at or near the third bending region and extending substantially parallel to the third direction, and does not have a slit, except for the fourth slit, in a region near the third edge portion, a portion of the plurality of edges of the pixel electrode that is located close to the fourth liquid crystal domain includes a fourth edge portion, the angle between an azimuth angle direction perpendicular to the fourth edge portion and pointing toward the inside of the pixel electrode, and the fourth direction, being greater than 90°, a portion of a region near the fourth edge portion of each of the plurality of pixels where the fourth edge portion intersects with a fourth boundary between the fourth liquid crystal domain and another liquid crystal domain is referred to as a fourth bending region, and the pixel electrode or the counter electrode has a fifth slit formed at or near the fourth bending region and extending substantially parallel to the fourth direction, and does not have a slit, except for the fifth slit, in a region near the fourth edge portion.

10. The liquid crystal display apparatus of claim 9, wherein the pixel electrode or the counter electrode has at least one sixth slit formed at or near the second boundary and extending substantially parallel to the second direction, the at least one sixth slit being shorter than the third slit, the pixel electrode or the counter electrode has at least one seventh slit formed at or near the third boundary and extending substantially parallel to the third direction, the at least one seventh slit being shorter than the fourth slit, and the pixel electrode or the counter electrode has at least one eighth slit formed at or near the fourth boundary and extending substantially parallel to the fourth direction, the at least one eighth slit being shorter than the fifth slit.

11. The liquid crystal display apparatus of claim 10, wherein the at least one sixth slit formed at or near the second boundary is a single sixth slit, the at least one seventh slit formed at or near the third boundary is a single seventh slit, and the at least one eighth slit formed at or near the fourth boundary is a single eighth slit.

12. The liquid crystal display apparatus of claim 8, wherein the first, second, third, and fourth liquid crystal domains are each located adjacent to the other liquid crystal domains and are arranged in a 2×2 matrix.

* * * * *